(12) United States Patent
Zilka et al.

(10) Patent No.: US 8,078,545 B1
(45) Date of Patent: *Dec. 13, 2011

(54) SYSTEM, METHOD AND COMPUTER PROGRAM PRODUCT FOR COLLECTING STRATEGIC PATENT DATA ASSOCIATED WITH AN IDENTIFIER

(75) Inventors: Kevin J. Zilka, San Jose, CA (US); Dominic M. Kotab, San Jose, CA (US)

(73) Assignee: Aloft Media, LLC, Longview, TX (US)

( * ) Notice: Subject to any disclaimer, the term of this patent is extended or adjusted under 35 U.S.C. 154(b) by 734 days.

This patent is subject to a terminal disclaimer.

(21) Appl. No.: 10/661,878

(22) Filed: Sep. 11, 2003

Related U.S. Application Data

(63) Continuation of application No. 10/324,887, filed on Dec. 18, 2002, now abandoned, which is a continuation-in-part of application No. 10/254,410, filed on Sep. 24, 2002, now abandoned.

(60) Provisional application No. 60/324,941, filed on Sep. 24, 2001.

(51) Int. Cl.
*G06Q 50/00* (2006.01)
(52) U.S. Cl. .................................................. 705/310
(58) Field of Classification Search .................. 705/310
See application file for complete search history.

(56) References Cited

U.S. PATENT DOCUMENTS

| | | | |
|---|---|---|---|
| 4,839,853 A | 6/1989 | Deerwester | 1/1 |
| 5,029,013 A | 7/1991 | Hiratsuka et al. | 358/335 |
| 5,159,334 A | 10/1992 | Baumert et al. | 340/825.72 |
| 5,297,039 A | 3/1994 | Kanaegami et al. | 707/5 |
| 5,540,597 A | 7/1996 | Budman et al. | 439/77 |
| 5,642,518 A | 6/1997 | Kiyama et al. | 704/7 |
| 5,671,295 A | 9/1997 | Miyake | 382/242 |
| 5,696,962 A | 12/1997 | Kupiec | 707/4 |
| 5,737,560 A | 4/1998 | Yohanan | 395/349 |
| 5,778,256 A | 7/1998 | Darbee | 395/892 |
| 5,794,233 A | 8/1998 | Rubinstein | 707/4 |
| 5,819,261 A | 10/1998 | Takahashi et al. | 707/3 |
| 5,877,765 A | 3/1999 | Dickman et al. | 345/349 |
| 5,877,767 A | 3/1999 | Yohanan | 345/357 |

(Continued)

FOREIGN PATENT DOCUMENTS

EP 1030247 A2 8/2000

(Continued)

OTHER PUBLICATIONS www.open-ideas.org- Open Ideas, retrieved Apr. 9, 2001.*

(Continued)

*Primary Examiner* — Dennis Ruhl
(74) *Attorney, Agent, or Firm* — Patrick E. Caldwell, Esq.; The Caldwell Firm, LLC

(57) ABSTRACT

A system, method and computer program product are provided for organizing patents utilizing a computer-implemented system. An identifier is initially determined, after which a notes field is displayed for receiving manually entered notes, such that the manually entered notes are stored in association with the identifier. Further, the manually selection of a file is permitted. Such manually selected file is then stored in association with the identifier. Still yet, a plurality of patents are associated with the identifier. The manually entered notes, the file, and the patents are thus accessible by subsequent selection of the identifier.

16 Claims, 26 Drawing Sheets

U.S. PATENT DOCUMENTS

| | | | |
|---|---|---|---|
| 5,895,465 A | 4/1999 | Guha | 707/4 |
| 5,913,215 A | 6/1999 | Rubinstein et al. | 707/10 |
| 5,917,491 A | 6/1999 | Bauersfeld | |
| 5,918,237 A | 6/1999 | Montalbano | 707/513 |
| 5,950,214 A | 9/1999 | Rivette et al. | 707/512 |
| 5,974,409 A | 10/1999 | Sanu et al. | 707/3 |
| 5,978,817 A | 11/1999 | Giannandrea et al. | 707/501 |
| 5,991,751 A | 11/1999 | Rivette et al. | 707/1 |
| 5,991,780 A | 11/1999 | Rivette et al. | 707/512 |
| 5,999,907 A | 12/1999 | Donner | 705/1 |
| 6,012,093 A | 1/2000 | Maddalozzo, Jr. et al. | 709/223 |
| 6,014,663 A | 1/2000 | Rivette et al. | 707/4 |
| 6,018,714 A | 1/2000 | Risen, Jr. et al. | 705/4 |
| 6,018,749 A | 1/2000 | Rivette et al. | 707/525 |
| 6,028,602 A | 2/2000 | Weidenfeller et al. | 345/340 |
| 6,037,934 A | 3/2000 | Himmel et al. | |
| 6,041,360 A | 3/2000 | Himmel et al. | |
| 6,072,491 A | 6/2000 | Yohanan | 345/349 |
| 6,081,829 A | 6/2000 | Sidana | 709/203 |
| 6,100,890 A | 8/2000 | Bates et al. | 345/357 |
| 6,108,651 A | 8/2000 | Guha | 707/4 |
| 6,154,725 A | 11/2000 | Donner | 705/1 |
| 6,173,251 B1 | 1/2001 | Ito et al. | 704/7 |
| 6,189,024 B1 | 2/2001 | Bauersfeld et al. | 709/203 |
| 6,230,171 B1 | 5/2001 | Pacifici et al. | 707/512 |
| 6,243,091 B1 | 6/2001 | Berstis | 345/349 |
| 6,252,597 B1 | 6/2001 | Lokuge | 345/353 |
| 6,263,314 B1 | 7/2001 | Donner | 705/1 |
| 6,275,862 B1 | 8/2001 | Sharma et al. | 709/245 |
| 6,314,423 B1 | 11/2001 | Himmel et al. | |
| 6,339,767 B1 | 1/2002 | Rivette et al. | 707/2 |
| 6,353,827 B1 | 3/2002 | Davies et al. | 707/6 |
| 6,381,651 B1 | 4/2002 | Nishio et al. | 709/245 |
| 6,389,434 B1 | 5/2002 | Rivette et al. | 707/512 |
| 6,434,580 B1 | 8/2002 | Takano et al. | 707/530 |
| 6,437,527 B1 | 8/2002 | Rhodes et al. | 318/280 |
| 6,460,058 B2 | 10/2002 | Koppolu et al. | 707/501.1 |
| 6,473,752 B1 | 10/2002 | Fleming, III | 707/708 |
| 6,478,001 B1 | 11/2002 | Burns et al. | 123/90.41 |
| 6,493,702 B1 | 12/2002 | Adar et al. | |
| 6,546,393 B1 | 4/2003 | Khan | 707/10 |
| 6,571,241 B1 | 5/2003 | Nosohara | 707/6 |
| 6,571,295 B1 | 5/2003 | Sidana | 709/246 |
| 6,578,078 B1 | 6/2003 | Smith et al. | 709/224 |
| 6,601,173 B1 | 7/2003 | Mohler | 713/201 |
| 6,667,751 B1 | 12/2003 | Wynn et al. | 345/833 |
| 6,694,331 B2 | 2/2004 | Lee | 707/706 |
| 6,697,838 B1 | 2/2004 | Jakobson | 709/203 |
| 6,973,456 B1 | 12/2005 | Elgart | |
| 6,973,616 B1 | 12/2005 | Cottrille et al. | 5/512 |
| 7,010,515 B2 | 3/2006 | Nakano | 707/776 |
| 7,028,253 B1 | 4/2006 | Lieberman et al. | 715/512 |
| 7,117,443 B1 | 10/2006 | Zilka et al. | 715/739 |
| 7,194,691 B1 | 3/2007 | Zilka et al. | 715/739 |
| 7,305,625 B1 | 12/2007 | Zilka et al. | 715/739 |
| 2001/0047404 A1 | 11/2001 | Suda | 709/223 |
| 2002/0007373 A1 | 1/2002 | Blair et al. | 707/505 |
| 2002/0019837 A1 | 2/2002 | Balnaves | 707/512 |
| 2002/0032654 A1 | 3/2002 | Waters | 705/54 |
| 2002/0035499 A1 | 3/2002 | Germeraad et al. | 705/9 |
| 2002/0042841 A1 | 4/2002 | Nishio et al. | 709/245 |
| 2002/0059076 A1 | 5/2002 | Grainger et al. | 705/1 |
| 2002/0070963 A1 | 6/2002 | Odero et al. | 345/739 |
| 2002/0077835 A1 | 6/2002 | Hagelin | 705/1 |
| 2002/0082778 A1* | 6/2002 | Barnett et al. | 702/1 |
| 2002/0093528 A1 | 7/2002 | Grainger | 345/738 |
| 2002/0111953 A1 | 8/2002 | Snyder | 707/101 |
| 2002/0147742 A1 | 10/2002 | Schroeder | 707/501.1 |
| 2002/0169743 A1 | 11/2002 | Arnold et al. | 707/1 |
| 2002/0184095 A1 | 12/2002 | Scullard et al. | 705/14 |
| 2002/0196272 A1 | 12/2002 | Ramos et al. | 345/738 |
| 2003/0016241 A1 | 1/2003 | Burke | 345/733 |
| 2003/0033295 A1 | 2/2003 | Adler et al. | 707/3 |
| 2003/0036945 A1 | 2/2003 | Del Vecchio et al. | 705/10 |
| 2003/0046307 A1* | 3/2003 | Rivette et al. | 707/104.1 |
| 2003/0076352 A1 | 4/2003 | Uhlig et al. | 345/738 |
| 2003/0135820 A1 | 7/2003 | Aasman | 715/500 |
| 2003/0172020 A1 | 9/2003 | Davies et al. | 705/36 |
| 2004/0181427 A1 | 9/2004 | Stobbs et al. | 705/1 |
| 2004/0193697 A1 | 9/2004 | Grosvenor et al. | 709/217 |
| 2004/0205537 A1 | 10/2004 | Graham et al. | 715/511 |
| 2005/0059076 A1 | 3/2005 | Merkulov et al. | 435/6 |
| 2005/0193330 A1 | 9/2005 | Peters | 715/513 |
| 2006/0212795 A1 | 9/2006 | Cottrille et al. | 715/512 |
| 2006/0294130 A1 | 12/2006 | Soo et al. | 707/102 |

FOREIGN PATENT DOCUMENTS

| | | |
|---|---|---|
| GB | 2339374 | 1/2000 |
| GB | 2339374 A | 1/2000 |
| JP | 08190572 A | 7/1996 |
| JP | 02002366797 | 6/2001 |
| JP | 2002366797 | 12/2002 |
| JP | 2002366797 A | 12/2002 |
| WO | WO97/17662 | 5/1997 |
| WO | 98/55945 A1 | 12/1998 |
| WO | WO98/55945 | 12/1998 |
| WO | 00/11575 A1 | 3/2000 |
| WO | WO00/11575 | 3/2000 |
| WO | 00/52618 A2 | 9/2000 |
| WO | 00/52618 A3 | 9/2000 |
| WO | WO00/52618 | 9/2000 |
| WO | 00/60495 A2 | 10/2000 |
| WO | 00/60495 A3 | 10/2000 |
| WO | 00/60496 A2 | 10/2000 |
| WO | WO00/60495 | 10/2000 |
| WO | WO00/60495 A2 | 10/2000 |
| WO | WO00/60495 A3 | 10/2000 |
| WO | WO00/60496 | 10/2000 |
| WO | WO 01/35277 | 11/2000 |
| WO | 00/75851 A1 | 12/2000 |
| WO | WO00/75851 | 12/2000 |
| WO | 01/35277 | 5/2001 |
| WO | WO 01/35277 A1 | 5/2001 |
| WO | WO 02/05150 * | 6/2001 |
| WO | 01/54031 A2 | 7/2001 |
| WO | WO01/54031 | 7/2001 |
| WO | 01/73657 A1 | 10/2001 |
| WO | WO01/73657 | 10/2001 |
| WO | 01/84423 A2 | 11/2001 |
| WO | 01/84424 A2 | 11/2001 |
| WO | 01/84425 A2 | 11/2001 |
| WO | 01/84426 A2 | 11/2001 |
| WO | WO01/84423 | 11/2001 |
| WO | WO01/84424 | 11/2001 |
| WO | WO01/84425 | 11/2001 |
| WO | WO01/84426 | 11/2001 |
| WO | WO 02/05150 | 1/2002 |
| WO | WO 02/05150 A2 | 1/2002 |
| WO | WO02/05150 A2 | 1/2002 |
| WO | 02/059147 A2 | 8/2002 |
| WO | WO02/59147 | 8/2002 |
| WO | WO02/059147 | 8/2002 |
| WO | 02/086744 A1 | 10/2002 |
| WO | WO02/86744 | 10/2002 |
| WO | WO02/086744 | 10/2002 |
| WO | 03/044718 | 5/2003 |
| WO | WO03/044718 A2 | 5/2003 |
| WO | WO 03/044718 A2 | 5/2003 |

OTHER PUBLICATIONS

"Getting Started with PatentLab-II; a Sample Analysis Scenario Included", Wisdomain, Inc., Version 1.1, May 6, 2000.

Office Action mailed Nov. 15, 2004 in U.S. Appl. No. 10/661,855, filed Sep. 11, 2003.

Office Action mailed Oct. 12, 2004 in U.S. Appl. No. 10/661,938, filed Sep. 11, 2003.

Office Action mailed Nov. 12, 2004 in U.S. Appl. No. 10/661,789, filed Sep. 11, 2003.

Office Action mailed Nov. 30, 2004 in U.S. Appl. No. 10/691,060, filed Oct. 22, 2003.

Office Action mailed Nov. 12, 2004 in U.S. Appl. No. 10/660,830, filed Sep. 11, 2003.

Office Action mailed Nov. 15, 2004 in U.S. Appl. No. 10/324,887, filed Dec. 18, 2002.

http://www.open-ideas.org/, Open Ideas, Apr. 6, 2001.

Roberts, Bill, Solving the Value Equation, Knowledge management Magazine, Jan. 2001.
www.uspto.gov retrieved from the Internet Archive Wayback Machine Nov. 8, 2004.
www.uspto.gov retrieved from the Internet Archive Wayback Machine Nov. 22, 2004.
Reedman, Alan, The Computer Desktop Encycloedia, AMACOM 1996.
Microsoft press Computer Dictionary third Edition Microsoft Press, 1997.
Office Action Summary from U.S. Appl. No. 10/691,057 which was mailed on Nov. 18, 2005.
Office Action Summary from U.S. Appl. No. 10/661,938 which was mailed on Oct. 6, 2005.
Office Action Summary from U.S. Appl. No. 10/324,887 which was mailed on Feb. 15, 2006.
Office Action Summary from U.S. Appl. No. 10/324,887 which was mailed on Jun. 28, 2005.
Office Action Summary from U.S. Appl. No. 10/661,855 which was mailed on Apr. 7, 2006.
Roberts, Bill, Solving The Value Equation, *Knowledge management Magazine*, Jan. 2001.
Open Ideas from www.open-ideas.org Apr. 6, 2001.
Roberts, Ginger, Derwent Information Global Patent Sources, 1995
www.uspto.gov retrieved from the Internet Archive Wayback Machine of date Dec. 9, 2000.
Freedman, Alan, "The Computer Desktop Encyclopedia", AMACOM 1996.
Microsoft Press Computer Dictionary Third Edition Microsoft Press 1997.
Office Action Summary from U.S. Appl. No. 10/661,855 which was mailed on Nov. 15, 2004.
Office Action Summary from U.S. Appl. No. 10/661,938 which was mailed on Jan. 26, 2005.
Office Action Summary from U.S. Appl. No. 10/660,830 which was mailed on Jun. 22, 2005.
East Search Screen Showing Copyright Date of 1999.
Dialog Pocket Guide, The Dialog Corporation, Copyright Date of 1998.
Microsoft Internet Explorer$_{5.2}$:mac Screenshot pp. 1-3.
"Internet Explorer for Mac" http://en.wikipedia.org/wiki/Internet_Explorer_for_Mac.
U.S. Appl. No. 11/688,200, filed Mar. 19, 2007.
U.S. Appl. No. 11/688,208, filed Mar. 19, 2007.
U.S. Appl. No. 11/688,191, filed Mar. 19, 2007.
Microsoft Internet Explorer Ver. 6.0.2800, Copyright 1995-2001.
Office Action Summary from U.S. Appl. No. 10/691,061 which was mailed on Apr. 19, 2007.
Office Action Summary from U.S. Appl. No. 10/661,878 which was mailed on May 7, 2007.
Office Action Summary from U.S. Appl. No. 10/324,887 which was mailed on Feb. 21, 2007.
Office Action Summary from U.S. Appl. No. 10/660,830 which was mailed on Feb. 21, 2007.
Office Action Summary from U.S. Appl. No. 10/661,788 which was mailed on Jun. 6, 2007.
Examiner's Answer from U.S. Appl. No. 10/660,830 which was mailed on Oct. 4, 2005.
Examiner's Answer from U.S. Appl. No. 10/661,938 which was mailed on Jun. 13, 2006.
Examiner's Answer from U.S. Appl. No. 10/661,855 which was mailed on Jun. 19, 2007.
U.S. Appl. No. 11/186,190, filed Jul. 21, 2005.
Office Action Summary from U.S. Appl. No. 10/254,410 which was mailed on May 1, 2008.
Office Action Summary from U.S. Appl. No. 10/661,788 which was mailed on Apr. 1, 2008.
Office Action Summary from U.S. Appl. No. 10/254,410 which was mailed on Oct. 1, 2007.
Office Action Summary from U.S. Appl. No. 10/691,090 which was mailed on Mar. 10, 2005.
Office Action Summary from U.S. Appl. No. 10/691,090 which was mailed on Oct. 7, 2005.
Office Action Summary from U.S. Appl. No. 10/691,090 which was mailed on Feb. 3, 2006.
Examiner's Answer from U.S. Appl. No. 10/691,090 which was mailed on Jan. 23, 2007.
Examiner's Answer from U.S. Appl. No. 10/691,090 which was mailed on Mar. 29, 2007.
BPAI Decision from U.S. Appl. No. 10/691,090 which was mailed on Sep. 15, 2010.
Office Action Summary from U.S. Appl. No. 10/324,887, which was mailed on Nov. 15, 2004.
Examiner's Answer to Appeal Brief from U.S. Appl. No. 10/324,887 which was mailed on Oct. 31, 2007.
Office Action Summary from U.S. Appl. No. 10/324,887 which was mailed on Nov. 15, 2007.
BPAI Decision from U.S. Appl. No. 10/324,887 which was mailed on Dec. 29, 2010.
Office Action Summary from U.S. Appl. No. 10/661,854 which was mailed on Sep. 29, 2008.
Office Action Summary from U.S. Appl. No. 10/661,789, which was mailed on Nov. 12, 2004.
Office Action Summary from U.S. Appl. No. 10/661,788 which was mailed on Jul. 10, 2006.
Final Office Action Summary from U.S. Appl. No. 10/661,788 which was mailed on Dec. 14, 2006.
Office Action Summary from U.S. Appl. No. 10/661,788 which was mailed on Oct. 30, 2007.
Final Office Action Summary from U.S. Appl. No. 10/661,788 which was mailed on Apr. 1, 2008.
Office Action Summary from U.S. Appl. No. 10/661,788 which was mailed on Oct. 3, 2008.
Final Office Action Summary from U.S. Appl. No. 10/661,788 which was mailed on Jul. 9, 2009.
Office Action Summary from U.S. Appl. No. 10/661,938, which was mailed on Oct. 12, 2004.
Final Office Action Summary from U.S. Appl. No. 10/661,938 which was mailed on Jan. 26, 2005.
Office Action Summary from U.S. Appl. No. 10/661,938 which was mailed on Aug. 10, 2007.
Office Action Summary from U.S. Appl. No. 10/661,938 which was mailed on Oct. 3, 2007.
BPAI Decision from U.S. Appl. No. 10/661,938 which was mailed on Sep. 15, 2009.
Office Action Summary from U.S. Appl. No. 10/661,855 which was mailed on Apr. 6, 2005.
Office Action Summary from U.S. Appl. No. 10/661,855 which was mailed on Oct. 7, 2005.
Office Action Summary from U.S. Appl. No. 10/661,855 which was mailed on Nov. 16, 2007.
BPAI Decision from U.S. Appl. No. 10/661,855 which was mailed on Jan. 27, 2011.
Office Action Summary from U.S. Appl. No. 10/660,830, which was mailed on Nov. 12, 2004.
Final Office Action Summary from U.S. Appl. No. 10/660,830 which was mailed on Jun. 22, 2005.
BPAI Decision from U.S. Appl. No. 10/660,830 which was mailed on Sep. 14, 2006.
Examiner's Answer from U.S. Appl. No. 10/660,830 which was mailed on Dec. 12, 2007.
BPAI Decision from U.S. Appl. No. 10/660,830 which was mailed on Nov. 6, 2009.
Office Action Summary from U.S. Appl. No. 11/186,190 which was mailed on Sep. 24, 2009.
Office Action Summary from U.S. Appl. No. 10/671,045 which was mailed on Sep. 25, 2008.
Office Action Summary from U.S. Appl. No. 10/671,045 which was mailed on Jun. 11, 2009.
Office Action Summary from U.S. Appl. No. 10/691,060, which was mailed on Nov. 30, 2004.
Final Office Action Summary from U.S. Appl. No. 10/691,060 which was mailed on Feb. 15, 2005.
Advisory Action from U.S. Appl. No. 10/691,060 which was mailed on Apr. 6, 2005.

Notice of Non-Compliance from U.S. Appl. No. 10/691,060 which was mailed on Jul. 8, 2005.

Examiners Answer from U.S. Appl. No. 10/691,060 which was mailed Oct. 4, 2005.

Office Action Summary from U.S. Appl. No. 10/691,060 which was mailed onDec. 27, 2005.

BPAI Decision from U.S. Appl. No. 10/691,060 which was mailed on May 18, 2006.

Request for Rehearing from U.S. Appl. No. 10/691,060 which was mailed on May 23, 2006.

The BPAI Decision for Request for Rehearing from U.S. Appl. No. 10/691,060 which was mailed on Oct. 27, 2006.

Petition Decision from U.S. Appl. No. 10/691,057 which was mailed on Jan. 7, 2005.

Petition Decision from U.S. Appl. No. 10/691,057 which was mailed on Apr. 15, 2005.

Office Action Summary from U.S. Appl. No. 10/691,057 which was mailed on Sep. 13, 2005.

Final Office Action Summary from U.S. Appl. No. 10/691,057 which was mailed on Nov. 18, 2005.

Advisory Action from U.S. Appl. No. 10/691,057 which was mailed on Feb. 8, 2006.

Office Action Summary from U.S. Appl. No. 10/691,057 which was mailed on Apr. 20, 2006.

Notice of Allowance from U.S. Appl. No. 10/691,057 which was mailed on Jun. 16, 2006.

Office Action Summary from U.S. Appl. No. 10/691,057 which was mailed on Aug. 22, 2006.

Request for *Inter Partes* Reexamination of U.S. Patent No. 7,117,443 which was mailed on Mar. 26, 2009 with exhibits.

Notice of Assignment of Reexamination Request of U.S. Patent No. 7,117,443 which was mailed on Apr. 6, 2009.

Litigation Search Report for Reexamination of U.S. Patent No. 7,117,443 which was mailed on Apr. 8, 2009.

Determination for Reexamination of U.S. Patent No. 7,117,443 which was mailed on Jun. 18, 2009.

Litigation Search Report for Reexamination of U.S. Patent No. 7,117,443 which was mailed on Dec. 8, 2009.

Office Action Summary from Reexamination of U.S. Patent No. 7,117,443 which was mailed on Dec. 16, 2009.

Notice of Intent to Issue a Reexam Certificate from Reexamination of U.S. Patent No. 7,117,443 which was mailed on Apr. 30, 2010.

Reexam Certificate from Reexamination of U.S. Patent No. 7,117,443 which was mailed on Jul. 13, 2010.

Office Action Summary from U.S. Appl. No. 10/695,258 which was mailed on Mar. 15, 2006.

Notice of Allowance from U.S. Appl. No. 10/695,258 which was mailed on Dec. 18, 2006.

Request for Inter Partes Reexamination of U.S. Patent No. 7,194,691 which was mailed on Mar. 26, 2009 with exhibits.

Notice of Assignment of Reexamination Request of U.S. Patent No. 7,194,691 which was mailed on Apr. 7, 2009.

Litigation Search Report for Reexamination of U.S. Patent No. 7,194,691 which was mailed on Apr. 8, 2009.

Determination for Reexamination of U.S. Patent No. 7,194,691 which was mailed on Jun. 18, 2009.

Litigation Search Report for Reexamination of U.S. Patent No. 7,194,691 which was mailed on Nov. 9, 2009.

Office Action Summary from Reexamination of U.S. Patent No. 7,194,691 which was mailed on Nov. 27, 2009.

Notice of Intent to Issue a Reexam Certificate from Reexamination of U.S. Patent No. 7,194,691 which was mailed on Apr. 23, 2010.

Reexam Certificate from Reexamination of U.S. Patent No. 7,194,691 which was mailed on Jul. 13, 2010.

Office Action Summary from U.S. Appl. No. 11/584,203 which was mailed on Oct. 1, 2010.

Office Action Summary from U.S. Appl. No. 11/584,180 which was mailed on Mar. 17, 2010.

Dialog Pocket Guide, The Dialog Corporation, Copyright Date of 2001.

Netscape Navigator v. 6.1, Released at least as early as Jun. 2001.

Manual of Patent Examination Procedure, Eight Edition, Section 900, pp. 1-3, as numbered.

Internet Explorer 5.X Basics Release Date for IE 5.5 Jul. 12, 2000.

Internet Basics IE 5.5, p. 7: Release date for IE 5.5 Jul. 12, 2000.

Defendant's Invalidity Contentions with Exhibits from Civil Action 6.08-CV-50 dated Oct. 24, 2008.

Defendant's Invalidity Contentions with Exhibits from Civil Action 6.08-CV-255 dated Feb. 9, 2009.

Defendant's Invalidity Contentions with Exhibits from Civil Action 6.08-CV-292 dated Jul. 16, 2009.

Defendant's Invalidity Contentions with Exhibits from Civil Action 6.08-CV-355 dated Jan. 14, 2008.

Defendant's Supplemental Invalidity Contentions from Civil Action 6.08-CV-355 dated May 8, 2008.

Defendant's Supplemental Invalidity Contentions with Exhibits from Civil Action 6.08-CV-355 dated Jul. 2, 2008.

Patricia Pantel, Dekang Lin, "A Statistical Corpus-Based Term Extractor" 2001.

Archived Webpages from Blink.com, 74 pages. (Feb. 2, 2009).

Archived Webpages from Clickmarks.com, 58 pages. (Oct. 5, 2008).

Archived Webpages from SpotOn.com, 74 pages. (Oct. 14, 2008).

Brs & West, Scientific and Technical information Center, USPTO, Jun. 1999, p. 4.

Chakrabarti, S. et al. (2000). "Using Memex to Archive and Mine Community Web Browsing Experience," Computer Networks 33:669-684.

East 1.1 Enhancements, Scientific and Technical Information Center, USPTO, Jul. 2000, pp. 5-86.

New Internet Explorer 5.5 Technologies Designed to Support Richer, Interactive Web Application (Jul. 12, 2000).

Pfaffenberger, B. (1995). Netscape Navigator 3.0, Surfing the Web and Exploring the Internet, AP Professional: Chestnut Hill, MA, pp. xv-xvi, 3, 5-12, 22, 76-84, 91-107, 201-209, 443.

SurfSaver.com Archived Webpages, 66 pages. (Feb. 19, 2009).

Underdahl, B. (2000). Opera Web Browser for Dummies, IDB Books Worldwide, Inc.: Foster City, CA, pp. 9-16, 28-32, 36-37, 40-42, 46-53, 67-93, 97, 152-153, 185-189.

Wisdomain, Inc. Version 1.1, May 6, 2000.

Office Action Summary from U.S. Appl. No. 10/661,788 mailed on Oct. 3, 2008.

Office Action Summary from U.S. Appl. No. 10/671,045 mailed on Sep. 25, 2008.

Office Action Summary from U.S. Appl. No. 10/661,854 mailed on Sep. 29, 2008.

Litigation Search Report for Reexamination of Patent No. 7,117,443 which was mailed on Apr. 8, 2009.

Determination for Reexamination of Patent No. 7,117,443 which was mailed on Jun. 18, 2009.

Litigation Search Report for Reexamination of Patent No. 7,117,443 which was mailed on Dec. 8, 2009.

Request for *Inter Partes* Reexamination of U.S. Patent No. 7,194,691 which was mailed on Mar. 26, 2009 with exhibits.

Office Action Summary from U.S. Appl. No. 11/688,191 which was mailed on Mar. 29, 2010.

Office Action Summary from U.S. Appl. No. 11/688,200 which was mailed on Jun. 26, 2009.

Office Action Summary from U.S. Appl. No. 11/688,208 which was mailed on Mar. 29, 2010.

Office Action Summary from U.S. Appl. No. 11/828,050 which was mailed on Sep. 13, 2010.

Office Action Summary from U.S. Appl. No. 11/828,061 which was mailed on Sep. 13, 2010.

Office Action Summary from U.S. Appl. No. 11/828,073 which was mailed on Jul. 24, 2009.

Office Action Summary from U.S. Appl. No. 11/828,088 which was mailed on Sep. 28, 2010.

Notice of Allowance from U.S. Appl. No. 10/691,061 which was mailed on Aug. 24, 2007.

Office Action Summary from U.S. Appl. No. 10/691,061 which was mailed on Oct. 29, 2007.

Certificate of Correction from U.S. Appl. No. 10/691,061 which was mailed on Dec. 4, 2007.

Request for *Inter Partes* Reexamination of US Patent No. 7,305,625 which was mailed on Feb. 6, 2009 with exhibits.

Litigation Search Report for Reexamination of Patent No. 7,305,625 which was mailed on Feb. 17, 2009.
Notice of Assignment of Reexamination Request of Patent No. 7,305,625 which was mailed on Feb. 17, 2009.
Determination for Reexamination of Patent No. 7,305,625 which was mailed on Apr. 30, 2009.
Office Action Summary from Reexamination of Patent No. 7,305,625 which was mailed on Nov. 30, 2009.
Litigation Search Report for Reexamination of Patent No. 7,305,625 which was mailed on Apr. 29, 2010.
Notice of Intent to Issue a Reexam Certificate from Reexamination of Patent No. 7,305,625 which was mailed on May 13, 2010.
Reexam Certificate from Reexamination of Patent No. 7,305,625 which was mailed on Aug. 3, 2010.
Office Action Summary from U.S. Appl. No. 11/119,482 which was mailed on Jan. 9, 2009.
Office Action Summary from U.S. Appl. No. 11/207,619 which was mailed on Sep. 29, 2008.
U.S. Appl. No. 10/661,788, filed Sep. 11, 2003.
U.S. Appl. No. 10/661,938, filed Sep. 11, 2003.
U.S. Appl. No. 10/671,045, filed Sep. 24, 2003.
U.S. Appl. No. 10/691,057, filed Oct. 22, 2003.
U.S. Appl. No. 10/691,060, filed Oct. 22, 2003.
U.S. Appl. No. 10/691,090, filed Oct. 22, 2003.
U.S. Appl. No. 10/695,258, filed Oct. 28, 2003.
U.S. Appl. No. 10/254,410, filed Sep. 24, 2004.
U.S. Appl. No. 10/324,887, filed Dec. 18, 2002.
U.S. Appl. No. 10/660,830, filed Sep. 11, 2003.
U.S. Appl. No. 10/661,789, filed Sep. 11, 2003.
U.S. Appl. No. 10/661,854, filed Sep. 11, 2003.
U.S. Appl. No. 10/661,855, filed Sep. 11, 2003.
U.S. Appl. No. 10/661,878, filed Sep. 11, 2003.
U.S. Appl. No. 11/584,180, filed Oct. 20, 2006.
U.S. Appl. No. 11/828,050, filed Jul. 25, 2007.
U.S. Appl. No. 11/828,061, filed Jul. 25, 2007.
U.S. Appl. No. 11/828,073, filed Jul. 25, 2007.
U.S. Appl. No. 11/828,088, filed Jul. 25, 2007.
U.S. Appl. No. 11/828,096, filed Jul. 25, 2007.
U.S. Appl. No. 10/691,061, filed Oct. 22, 2003.
U.S. Appl. No. 11/119,482, filed Apr. 29, 2005.
U.S. Appl. No. 11/207,619, filed Aug. 18, 2005.
U.S. Appl. No. 11/584,203, filed Oct. 20, 2006.
Documents from Civil Action No. 6:07-cv-355-LED.
Microsoft Internet Explorer$_{5.2}$:mac Screenshot pp. 1-3.
http://www.open-ideas.org/OI,information, Open Ideas, Apr. 9, 2001.
Roberts, Ginger, Derwent Information Global Patent Sources, 1995.
www.uspto.gov retirieved from the Internet Archive Wayback Machine Jul. 6, 2000.
www.uspto.gov retrieved from the Internet Archive Wayback Machine Dec. 19, 2000.
Netscape Navitgator v. 6.1, Released at least as early as Jun. 2001.
Internet Explorer 5.X Basics (Release Date for IE 5.5 Jul. 12, 2000.
Internet Basics (IE 5.5, p. 7: Release date for IE 5.5 Jul. 12, 2000.
www.open-ideas.org—Open Ideas from Apr. 9, 2001.
www.uspto.gov retreived from the Internet Archive Wayback Machine of date Dec. 19, 2000.
Freedman, Alan, The Computer Desktop Encyclopedia, AMACOM 1996.
www.uspto.gov retrieved from the Interent Archive Wayback Machine Jul. 6, 2000.

* cited by examiner

1. A method for reporting on strategic intellectual property management utilizing a computer-implemented system, comprising:
   (a) receiving a plurality of intellectual property identifiers identifying intellectual property;
   (b) identifying competing activity documentation describing a plurality of competing activities;
   (c) storing the intellectual property identifiers and the competing activity documentation in memory;
   (d) correlating the intellectual property identifiers with the competing activity documentation utilizing a processor coupled to the memory; and
   (e) reporting on the correlation between the intellectual property identifiers with the competing activity documentation utilizing an output device coupled to the processor.

1000 CLAIM

((reporting and (strategic <near> intellectual <near> property) and (computer <near> implemened <near> system) ………)

1002 STRING 1

(reporting and property and computer and system) ………

1004 STRING 2

Figure 10

| IP ASSET1 | STATUS | IP ASSET1 INFORMATION | TECHNOLOGY GROUP | COMPETING PATENTS | COMPETING PATENTS INFORMATION | COMPETING ACTIVITY |
|---|---|---|---|---|---|---|
| IP ASSET1 | PENDING | PAT #, TITLE, CLAIM, ETC. | TECHNOLOGY GROUP1 | PAT #1 | PAT #, TITLE, CLAIM, ETC. | URL1 |
| | | | | PAT #1 | PAT #, TITLE, CLAIM, ETC. | FILE2 |
| | | | | PAT #3 | PAT #, TITLE, CLAIM, ETC. | NOTES4 URL3 |
| | | | | PAT #3 | PAT #, TITLE, CLAIM, ETC. | |
| IP ASSET2 | ABANDONED | PAT #, TITLE, CLAIM, ETC. | TECHNOLOGY GROUP4 | PAT #7 | | URL4 |
| | | | | PAT #5 | | FILE3 |
| | | | | | | NOTES1 |
| IP ASSET3 | ISSUED | PAT #, TITLE, CLAIM, ETC. | TECHNOLOGY GROUP3 | PAT #1 | | URL6 |
| | | | | PAT #6 | | FILE12 |
| | | | | PAT #2 | | NOTES3 |
| TECH GROUP1 | | | | | | URL1 |
| TECH GROUP2 | | | | | | NOTES4 |

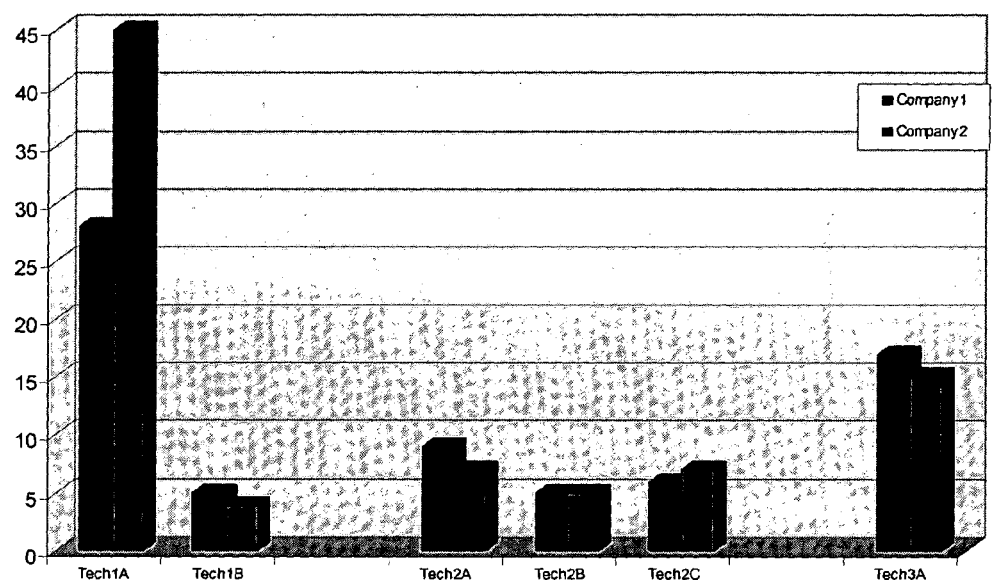
1380 
Fig. 13B

1700

SYSTEM, METHOD AND COMPUTER PROGRAM PRODUCT FOR COLLECTING STRATEGIC PATENT DATA ASSOCIATED WITH AN IDENTIFIER

RELATED APPLICATION(S)

The present application is a continuation of U.S. application Ser. No. 10/324,887 filed Dec. 18, 2002, now abandoned, which, in turn, is continuation-in-part of prior U.S. application Ser. No. 10/254,410 filed Sep. 24, 2002, now abandoned, which claims priority from U.S. provisional application 60/324,941, filed Sep. 24, 2001, which are all incorporated herein by reference.

BACKGROUND AND FIELD OF THE INVENTION

The present invention relates to patent management tools, and more particularly to the use of patent management tools to increase the value of patents and exploit the same.

DISCLOSURE OF THE INVENTION

A system, method and computer program product are provided for organizing patents utilizing a computer-implemented system. An identifier is initially determined, after which a notes field is displayed for receiving manually entered notes, such that the manually entered notes are stored in association with the identifier. Further, the manually selection of a file is permitted. Such manually selected file is then stored in association with the identifier. Still yet, a plurality of patents are associated with the identifier. The manually entered notes, the file, and the patents are thus accessible by subsequent selection of the identifier.

BRIEF DESCRIPTION OF THE DRAWINGS

FIG. 10 shows the manner in which a claim may be converted into a search string.

FIG. 11 is a chart showing a data structure associated with the information collected, in accordance with one embodiment.

FIGS. 13A-B illustrate other exemplary technology map reports, in accordance with a 3-D embodiment.

DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
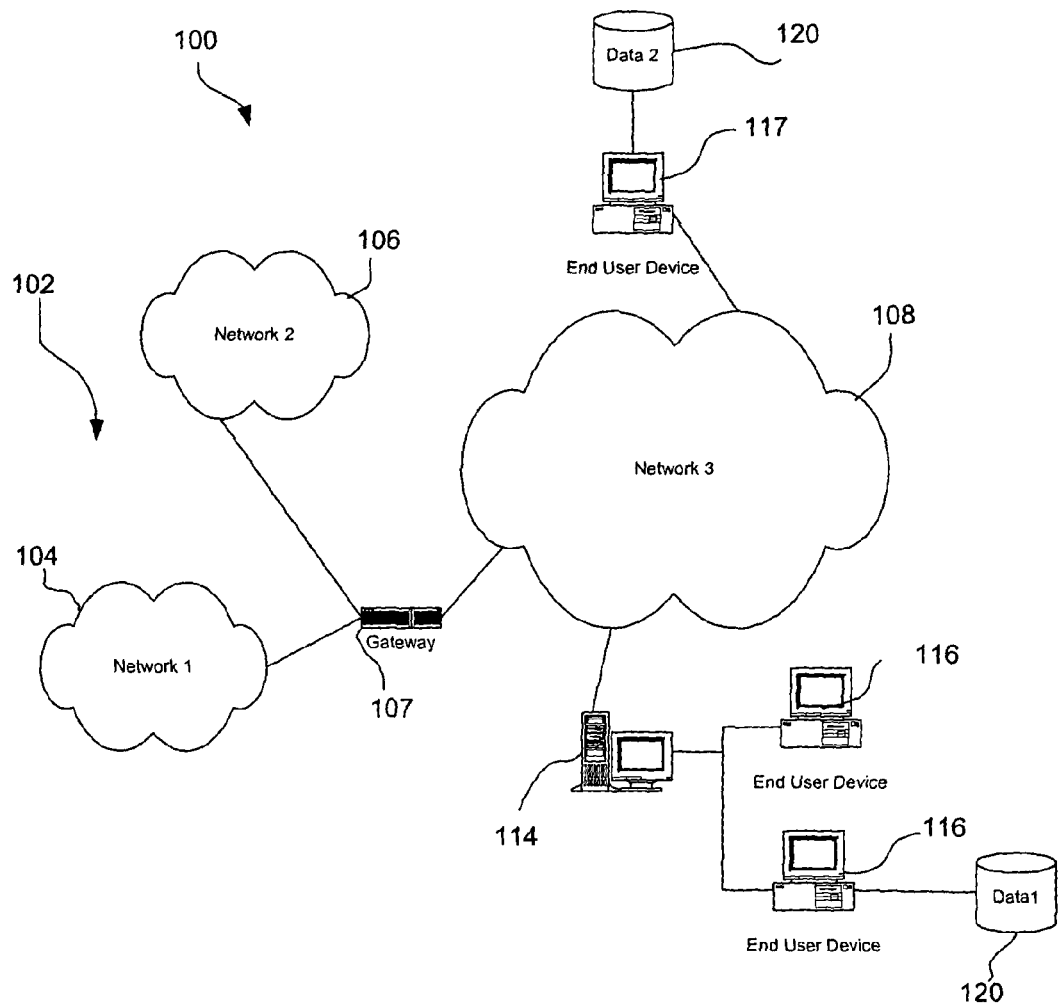
FIG. 1 illustrates a network architecture, in accordance with one embodiment.

FIG. 1 illustrates a network architecture 100, in accordance with one embodiment. As shown, a plurality of networks 102 are provided including a first network 104 and a second network 106. Also included is at least one gateway 107 coupled between the networks 102 and a third network 108. In the context of the present network architecture 100, the networks 104, 106, 108 may each take any form including, but not limited to a local area network (LAN), a wide area network (WAN) such as the Internet, a wireless network, etc. Further, any number of networks may be included.

In use, the gateway 107 serves as an entrance point from the networks 102 to the third network 108. As such, the gateway 107 may function as a router, which is capable of directing a given packet of data that arrives at the gateway 107, and a switch, which furnishes the actual path in and out of the gateway 107 for a given packet.

Further included is at least one server 114 coupled to the third network 108, and which is accessible from the networks 102 via the gateway 107. It should be noted that the server(s) 114 may include any type of computing device/groupware. Coupled to each server 114 is a plurality of user devices 116. Such user devices 116 may include a desktop computer, laptop computer, hand-held computer, printer or any other type of logic. It should be noted that a user device 117 may also be directly coupled to any of the networks, in one embodiment.

For reasons that will soon become apparent, the user devices 116 and/or server(s) 114 may be equipped with databases 120, i.e., collections of data. Such databases may include information on intellectual property. For example, the databases 120 may include a plurality of intellectual property identifiers which each identify a specific piece of intellectual property. In the context of the present description, intellectual property refers to any patent, patent application, invention disclosure, trademark, copyright, trade secret, or any other granted or potential right in an intangible entity. In the case of patents, patent applications, and invention disclosures, the aforementioned identifier may include a patent number, patent application serial number, issue date, filing date, docket number, and/or any other information which identifies and/or is associated with the intellectual property.

As an option, for reasons that will soon become apparent, the databases 120 may include business logic include information as to a status of particular products and/or product cycles associated (i.e. protected by) the intellectual property identifiers, current intellectual property budget constraints, ratings associated with the patents, a list of key competitive companies. etc. corresponding with the intellectual property identifiers. Still yet, such ratings may be manually and/or automatically generated based on a traditional factors such as a visibility of the technology covered by a particular patent (important in ascertaining infringement), whether the technology covered by a particular patent is to be adopted as a standard, the level of fundamentality of the technology covered by a particular patent, etc. Thus, one or more databases are provided with any of the foregoing information.

Moreover, the intellectual property identifiers in the databases 120 may be owned by a particular company or other entity in the form of a docketing database or the like. In the alternative, the databases 120 may be a comprehensive set of intellectual property identifiers which are currently granted, published, and/or otherwise received by a governmental authority, i.e. United States Patent Office.

In addition, servers coupled to remote networks 104, 106 and/or the third network 108 may also have access to competing activity documentation such as online information, product information, advertising and promotional materials, etc.

Figure 2:
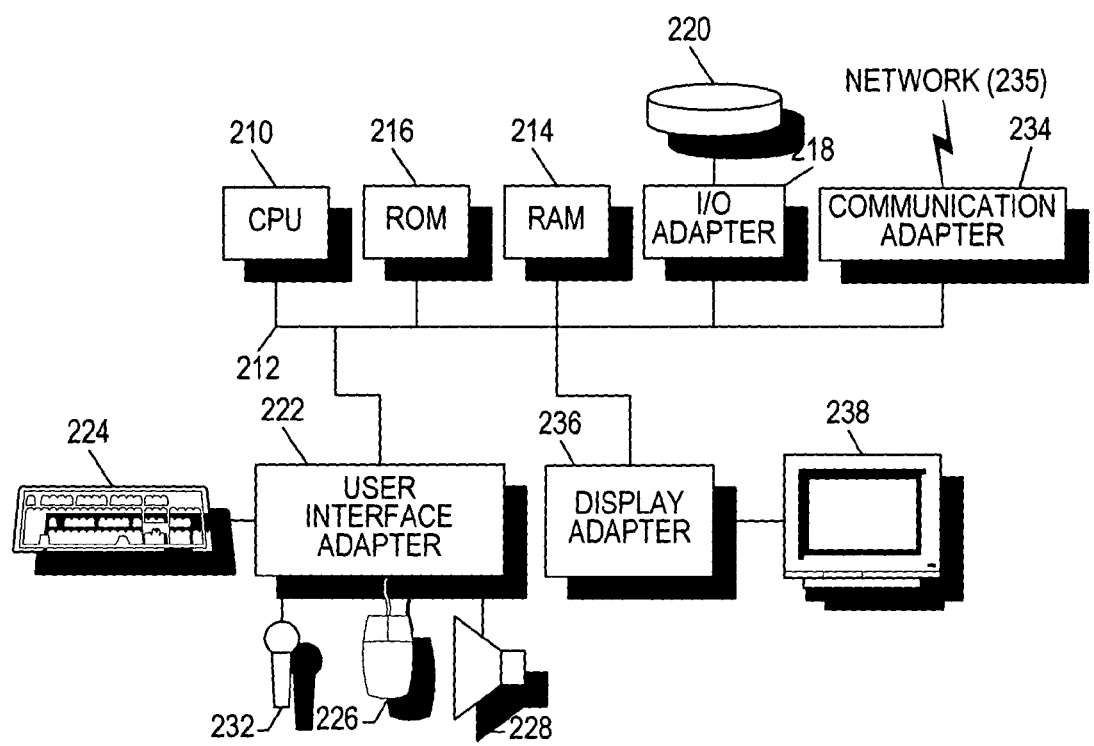
FIG. 2 shows a representative hardware environment that may be associated with the various network components of FIG. 1, in accordance with one embodiment.

FIG. 2 shows a representative hardware environment that may be associated with the various network components of FIG. 1, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Figure 3:
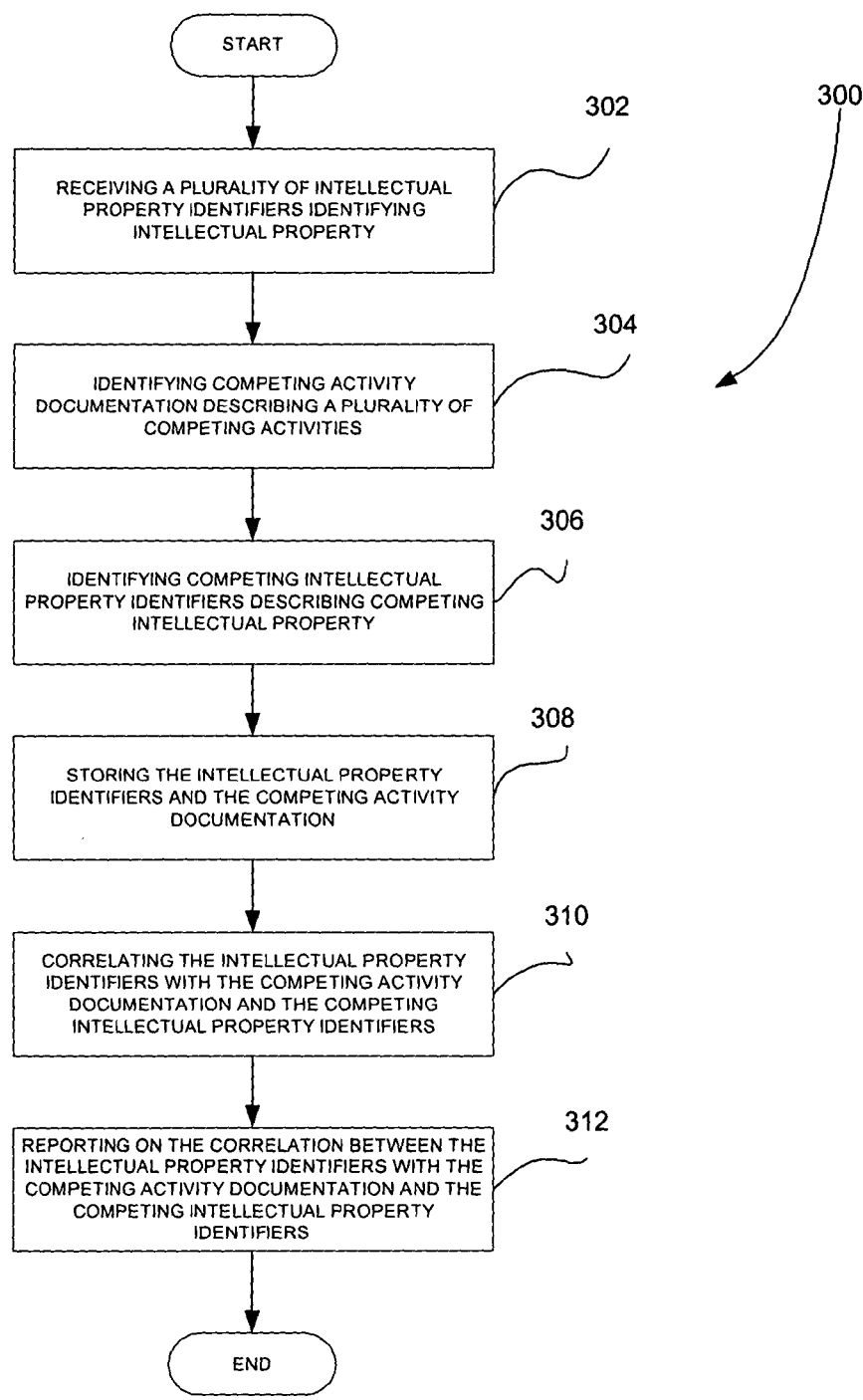
FIG. 3 illustrates a method for reporting on competing activity during strategic intellectual property management utilizing a computer-implemented system, in accordance with one embodiment.

FIG. 3 illustrates a method 300 for reporting on competing activity during strategic intellectual property management utilizing a computer-implemented system, in accordance with one embodiment. Initially, in operation 302, a plurality of intellectual property identifiers identifying intellectual property are received. In the context of the present description, the intellectual property identifiers may be received in any manner. For example, the intellectual property identifiers may be manually entered, received from one of the databases 120, transmitted over a network, gleaned or "mined" from a collection of data, etc. More information will be set forth hereinafter regarding an exemplary way of receiving the intellectual property identifiers.

Further, in operation 304, competing activity documentation is identified describing a plurality of competing activities. Similar to the intellectual property identifiers, the competing activity documentation may be received by manual entry, from any sort of database, from the Internet, from a remote application, etc. Moreover, the competing activity documentation refers to any documentation relating to a competing activity, which, in the context of the present description, refers to any activity that does or potentially would infringe on or interfere with the rights (or potential rights) appurtenant to the intellectual property. More information will be set forth hereinafter regarding the competing activity documentation, as will an exemplary way of identifying the competing activity documentation.

As will soon become apparent, competing intellectual property identifiers may be used to identify competing intellectual property in a manner similar to that in which the intellectual property identifiers are used to identify the intellectual property. See operation 306. While not currently shown, it should be noted that various technology categories may also be defined for later correlation.

Next, in operation 308, such intellectual property identifiers and the competing activity documentation are stored in memory. Moreover, the intellectual property identifiers are correlated with the competing activity documentation utilizing a processor coupled to the memory (see FIG. 2). See operation 310. This correlation may include showing any particular relationship between the intellectual property identifiers and the competing activity documentation for the purposes of intellectual property management.

In operation 312, such correlation between the intellectual property identifiers and the competing activity documentation may then be reported upon utilizing an output device coupled to the processor (again see FIG. 2). More information will now be set forth regarding each of the operations set forth herein above.

Registration of Intellectual Property (302/304)

Figure 4:
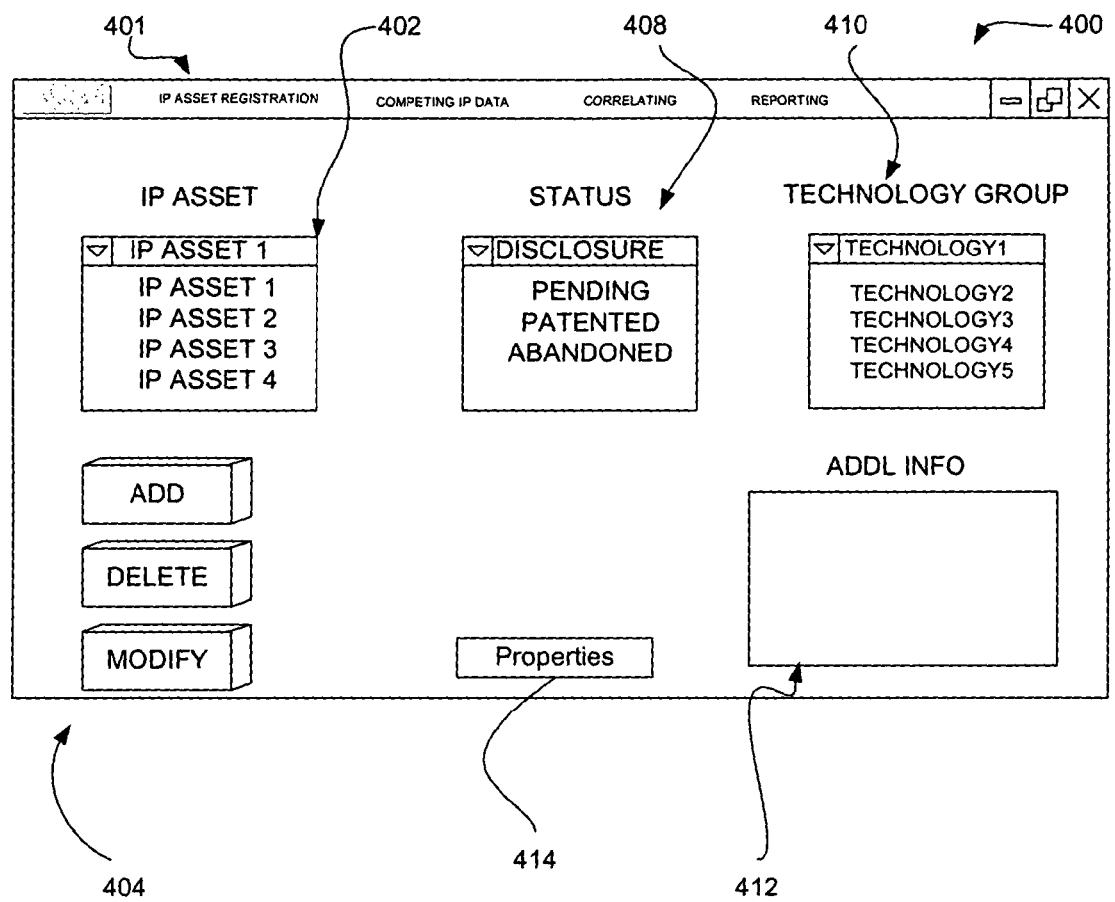
FIG. 4 illustrates an exemplary graphical user interface for registration of intellectual property, in accordance with one embodiment.

FIG. 4 illustrates an exemplary graphical user interface 400 for registration of intellectual property, in accordance with one embodiment. While the current graphical user interface 400 is designed for the purpose of registration of the intellectual property of a particular company, individual, or entity; any other mechanism may be utilized per the desires of the user.

As will soon become apparent, the exemplary graphical user interface 400 is a single interface among many that may be used as a software tool to accomplish the various operations set forth during reference to FIG. 3. Accordingly, other graphical user interfaces associated with other operations of FIG. 3, may be accessed via registration, competing patent data, competing activity documentation, and reporting tabs 401.

As shown, an intellectual property identifier pull-down window 402 may be provided for selecting an existing intellectual property identifier or adding another. Such pull-down window 402 may be utilized in conjunction with add, delete, and modify icons 404 to accomplish this task. Once added or selected, information relating to the present intellectual property identifier may be entered via various other fields and/or pull-down windows.

For example, a status pull-down window 408 may be provided for assigning a status of the intellectual property identified by the intellectual property identifier. In the case of patents, such status may include disclosure, pending, patented, and/or abandoned. Of course, any other status may be used per the desires of the user.

Still yet, a technology group pull-down window 410 may be provided for assigning the intellectual property identified by the intellectual property identifier to a technology group. Again, the technology group may be selected from an existing list of technology groups or generated using the add, delete, and modify icons 404. It should be noted that the technology groups refer to any technology genres in which the intellectual property identified by the current intellectual property identifier may be categorized. Such technology categories may be identified with descriptive names of such technology categories.

Other information may be associated with the intellectual property identified by the intellectual property identifier using the current graphical user interface 400. For example, exemplary claims associated with the intellectual property and/or other pertinent information may be entered, cut-and-pasted, dragged-and-dropped, etc. utilizing a field 412 of the current graphical user interface 400.

All of the information stored via the interface 400 can be stored in a central registration database, thereby allowing multiple users to each access individual instances of the interface 400. As an option, data associated with IP assets can be merged into the registration database from a docketing system or other repository.

A screen showing a report of the current registration information of the intellectual property associated with a currently selected intellectual property identifier can be displayed upon selection of a Properties button 414. The registration information can include all or a portion of the information added using the graphical user interface shown in FIG. 4.

Figure 5:
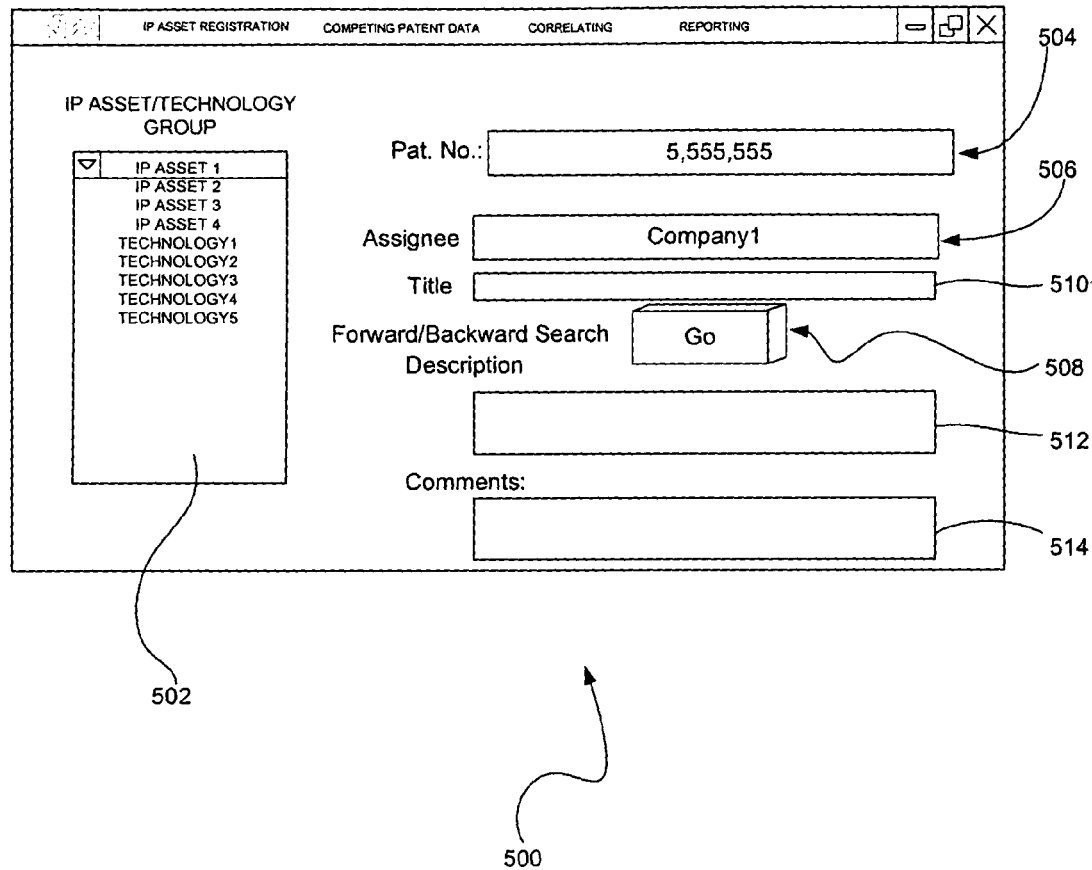
FIG. 5 illustrates an exemplary graphical user interface for registration of competing intellectual property associated with intellectual property identifiers, in accordance with one embodiment.

FIG. 5 illustrates an exemplary graphical user interface 500 for registration of competing intellectual property associated with the intellectual property identifiers, in accordance with one embodiment. While the current graphical user interface 500 is designed for the purpose of registration of the competing intellectual property of a particular company, individual, or entity; it should be noted that any other mechanism may be utilized per the desires of the user.

As shown in FIG. 5, either one of the intellectual property identifiers or technology groups may be selected utilizing an intellectual property identifier/technology group pull-down window 502. It should be noted that such pull-down window 402 may be utilized in conjunction with unillustrated add, delete, and modify icons to select or add intellectual property identifiers and/or technology groups that are not currently registered.

Also included is a patent number field 504 and an assignee field 506 for entering information (i.e. a competing intellectual property identifier, corresponding assignee, respectively) regarding competing intellectual property. Preferably, the patent number field includes a pull-down menu which allows the user to select previously entered competing intellectual property. Of course, any other pertinent information may be gathered per the desires of the user. By selecting an intellectual property identifier and/or technology group item from the pull down window 502 and filling in/selecting a patent number in the patent number field 504, the user, in effect, correlates the competing intellectual property with either the intellectual property identifiers and/or technology groups. Note that the patent number field may include any other type of identifier, such as a filing number, internal reference number, etc. of the competing intellectual property.

In an alternate embodiment, the competing intellectual property identifiers may be collected by doing a "forward search" or "backward search" utilizing information positioned on the patent, utilizing the aforementioned databases 120 of FIG. 1, or any other data source. As an option, such a "forward search" or "backward search" may be initiated automatically or manually upon the selection of a corresponding icon 508 found on the graphical user interface 500. As an example, a backward search can be performed by identifying patents listed on the face of the patent itself or in its text.

As an option, a title field 510 may be provided for entering/displaying the title of the patent whose number appears in the patent number field 504. Also optionally, a description of the patent can be entered/displayed in a description field 512. Such description can include the abstract of the patent, a user-generated description, etc. Further, a comments field 514 can be provided for entering/displaying any type of additional information regarding the competing intellectual property. Additional fields (not shown) can also be included.

The patent title, assignee, description, etc. can be retrieved automatically from a database upon entry (or selection) of the patent number. One database from which the information can be retrieved is the patent database of the U.S. Patent Office, which is accessible via the Internet.

Identifying Competing Activity and Correlating the Same (306/308)

Intelligence used during patent selection and procurement can take on many different forms. In the context of the present discussion, intelligence may include any information relating to the contents of a patent portfolio and the activities conducted by a company. Ideally, this intelligence is collected for both the company whose portfolio is being managed, and for any competitor with patents and/or activities that overlap those of the company.

Market Intelligence

With the advent of the Internet and the information age, the ability to gather market intelligence has been tremendously enhanced. In the interest of marketing their products, companies disclose a sizeable amount of information on web-sites to inform the public of product and service activities. This information may take various forms such as press releases, data sheets, user manuals, white papers, etc. Further, many independent third-party organizations provide product and service reviews. Of course, traditional information gathering methods such as reverse engineering, trade shows, etc. are still viable though often more expensive ways of collecting market intelligence.

Patent Intelligence

Less than 10 years ago, the most prevalent method used to collect patent intelligence involved sitting down in the United States Patent Office (USPTO) search room and thumbing through "shoes" of patents. Today, however, on-line databases provide an effective means of accessing a vast amount of information on not only United States patents and patent applications, but also foreign patents, non-patent literature, etc. Examples of such publicly available on-line databases include the USPTO patent search portal (http://www.uspto.gov/patft/index.html) and the Delphion® database (http://www.delphion.com).

In addition to actively searching for patents using the foregoing databases, various services are available whereby search queries are saved and automatically run on a periodic basis. Such services render automatic e-mail alerts or the like to provide a notification of recently published patents and applications matching the search criteria.

Using the foregoing tools, a great deal of valuable information may be obtained for use when building a patent portfolio. As the size of a patent portfolio increases, there is a coinciding need to organize this vast amount of information in a manner in which it can be effectively employed.

Figure 6:
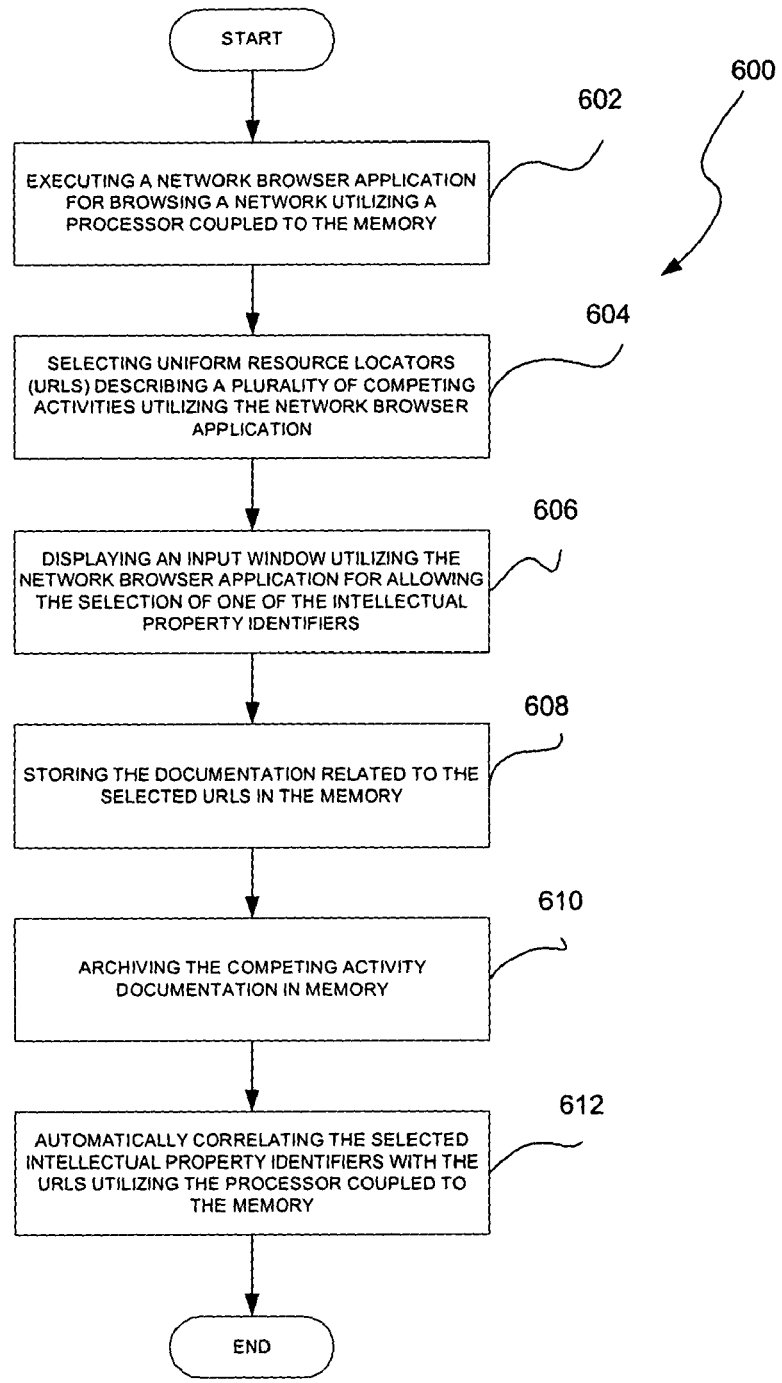
FIG. 6 illustrates a method for collecting competing activity documentation, in accordance with operation 306 of FIG. 3.

FIG. 6 illustrates one possible method 600 for collecting competing activity documentation, in accordance with operation 306 of FIG. 3. Such process begins in operation 602, by executing a network browser application for browsing a network utilizing a processor coupled to the memory (see FIG. 2). Such network browser application may include, but is not limited to MICROSOFT INTERNET EXPLORER, NETSCAPE NAVIGATOR, or any other application capable of allowing browsing of a network such as the Internet.

During use, in operation 604, uniform resource locators (URLs) to data sites/files describing a plurality of competing activities are selected utilizing the network browser application. It should be noted that such selection process may be accomplished in any desired manner, such as simply browsing the particular URL.

Once the URL has been selected, an input window may be displayed utilizing the network browser application for allowing the selection of one of the intellectual property identifiers. See operation 606. Such selection may include manual entry of one of the intellectual property identifiers, or the selection thereof via a list. More information on one exemplary embodiment of such window will be set forth in greater detail during reference to FIG. 7. In an alternate embodiment, the appropriate intellectual property identifier(s) may be identified in a window separate from the network browser application, such that any competing activity documentation selected during use of the network browser application results in automatic correlation with the pre-selected intellectual property identifier(s).

The documentation related to the selected URLs is then stored in the memory, as set forth in operation 608. Such documentation can include web pages, articles, spreadsheets, slide shows, compressed documents such as files in Portable Document Format (.pdf), etc. and can even include multimedia files and streaming multimedia. Still yet, in operation 610, the documentation related to the selected URLs may be archived for later use. This feature is critical for storing evidence of such competing activity, as content of URLs are often subject to change.

Preferably, the URL or pointer information is stored with the documentation. Also preferably, the date is also saved with the documentation to show when the documentation was discovered. The date is ideally retrieved from an independent site, such as from the National Institute of Standards and Technology site (http://nist.time.gov/timezone.cgi?Pacific/d/~8/java), so that the date is virtually indisputable.

Next, in operation 612, the selected intellectual property identifiers are correlated with the URLs utilizing the processor coupled to the memory (see FIG. 2).

Figure 7:
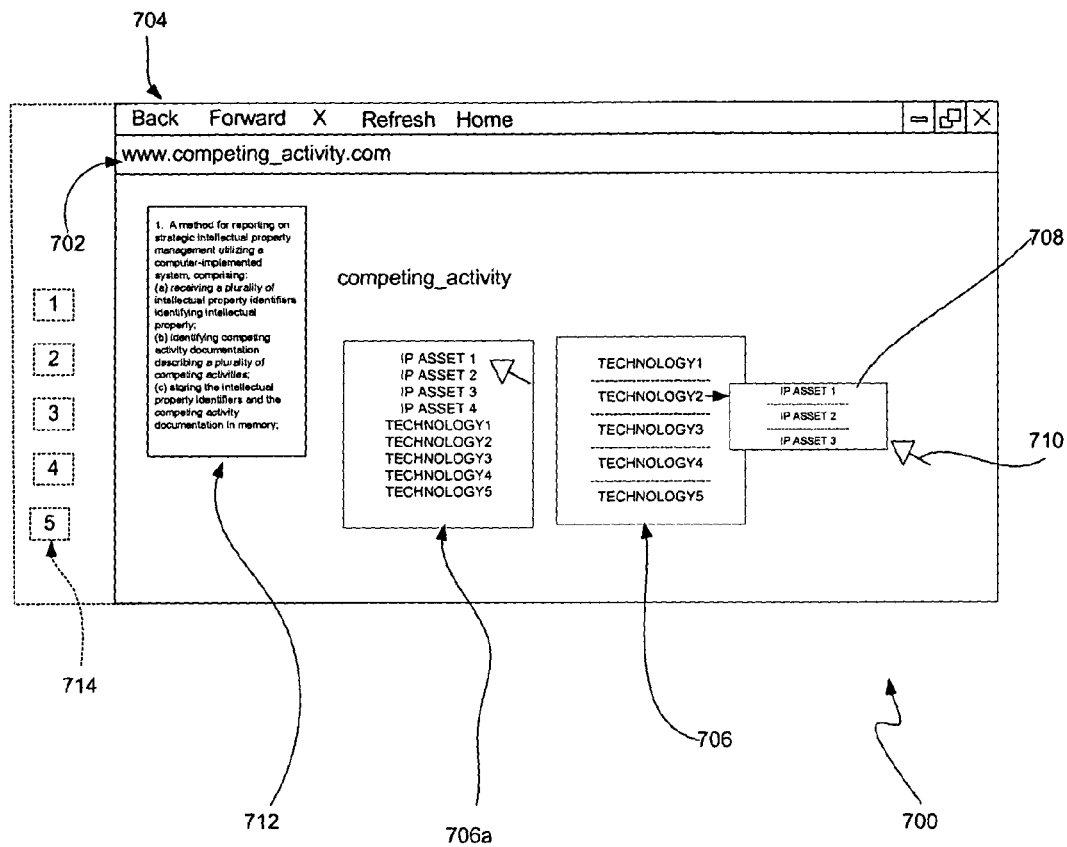
FIG. 7 illustrates an exemplary graphical user interface for collecting competing activity documentation from the Internet utilizing a network browser application, in accordance with one embodiment.

FIG. 7 illustrates an exemplary graphical user interface 700 for collecting competing activity documentation from the Internet utilizing a network browser application, in accordance with one embodiment. While the graphical user interface 700 described herein is designed for the purpose of collecting such Internet-based competing activity documentation; it should be noted that any other designs may be utilized per the desires of the user.

As shown in FIG. 7, a user may select or enter a URL using a URL field 702, in combination with a plurality of controls 704. A page or data associated with the URL is displayed on the browser, upon which a pop-up window 706 may be displayed on the network browser. It should be understood that the pop-up window 706 may be displayed in response to a certain mouse click (i.e. right mouse click), a keyboard command, or any other prompting mechanism. In the alternative, the pop-up window 706 may continuously be displayed when utilizing the network browser in a data collection mode.

In one embodiment, the pop-up window 706 may include a plurality of technology categories which may be selected for correlation with the present competing activity documentation. As an option, selection of the technology categories may prompt a sub-window 708 to be displayed showing a plurality of intellectual property identifiers previously correlated with the selected technology category. By this design, a specific technology category or intellectual property identifier may be selected with a cursor 710 in order to correlate the competing activity documentation therewith.

Note that the documentation stored may be just the content item positioned under the cursor and/or the entire page.

In an alternate embodiment, a similar pop-up window 706a may be used which delineates both technology categories and intellectual property identifiers on a single window for selection purposes.

In another alternate embodiment, the competing activity documentation (or the pointer to it) may be dragged and dropped into a "bucket" upon which it is stored as set forth above. See optional buckets 714 in FIG. 7. Further, a bucket may be provided for each technology group and/or intellectual property identifier. In the latter case, the individual bucket may be accessed by a series of submenus, such as the submenus 706, 708 described above. As an option, the various buckets may be selected (i.e. clicked) for identifying further information about the associated technology group and/or intellectual property identifier to facilitate the search and collection of competing activity.

Still yet, a claim of a particular IP asset associated with a user's search may be selectively displayed in a separate window 712 or some other manner that allows the user to inspect the claim during the search for competing activity. This window 712 may share the screen with the network browser or be placed thereover.

In any case, once selected, a URL and any associated text, links, pictures, other content, etc. may be stored for correlation with the appropriate technology categories and intellectual property identifiers. Such correlation may then be reported later, as will soon become apparent.

It should be noted that the collection of the foregoing intelligence may be a manual process which may be enhanced by the foregoing techniques. Of course, automatic "mining" techniques may be employed to automatically collect information on a periodic basis, or on a user-defined timeline. In any case, it is desired to update the information in the database on a continuous basis, i.e., in real time as data is received or daily, bi-weekly, etc.

Figure 8:
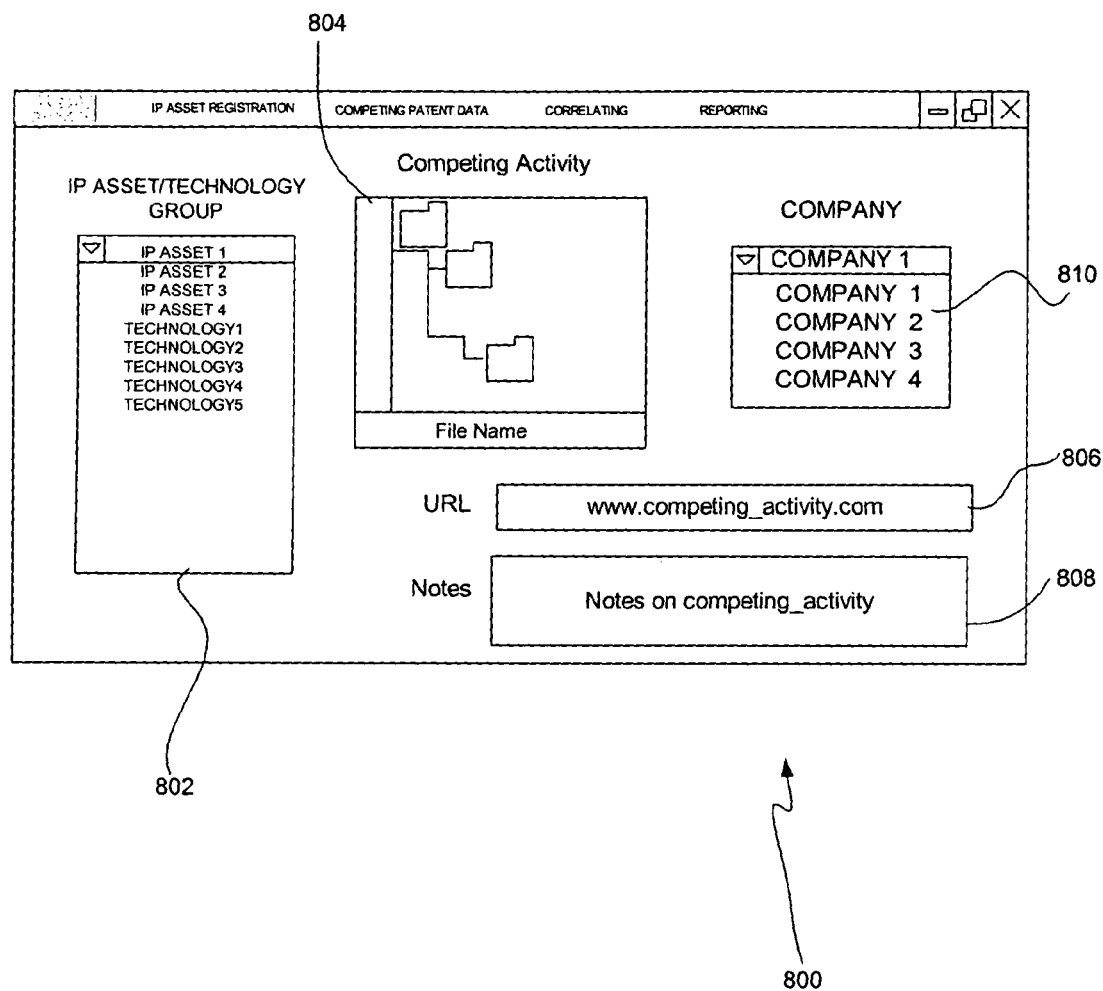
FIG. 8 illustrates an exemplary graphical user interface for alternatively collecting competing activity documentation from the Internet utilizing any one of three available methods, in accordance with one embodiment.

FIG. 8 illustrates an exemplary graphical user interface 800 for alternatively collecting competing activity documentation from the Internet utilizing any one of three available methods, in accordance with one embodiment. While the current graphical user interface 800 is designed for the purpose of collecting competing activity documentation in three different ways; it should be noted that any other designs may be utilized per the desires of the user.

As shown, an intellectual property identifier pull-down window 802 may be provided for selecting an existing intellectual property identifier or adding another. Such pull-down window 802 may be utilized in conjunction with unillustrated add, delete, and modify icons to accomplish this task. Once added or selected, information regarding the present intellectual property identifier may be entered via various other fields and/or pull-down windows.

As shown, a first file structure field 804 may be used to select competing activity documentation stored in memory of a present machine or across a network. By this file structure field 804, a user may browse various folders where such documentation may have been previously stored.

A second method of collection is provided by way of a URL entry field 806. Such URL entry field 806 may simply be filled with URLs uncovered during use of network browser application. Again, the user may type in the URL, paste a URL in, drag and drop a URL, etc. As an option, the present embodiment may automatically link to the URL via a network upon entry of the URL, retrieve information from the associated site, and store information related thereto.

Still yet another method of collection may be provided via a notes entry field 808 which may be used to fill in information on competing activity. Further, a user may choose to cut and paste and/or drag and drop information in such field.

Optionally, a company pull-down window 802 may be provided for selecting an existing intellectual property identifier or adding another. Such pull-down window 802 may be utilized in conjunction with unillustrated add, delete, and modify icons to accomplish this task. In use, a user may enter a company name to associate with the competing activity documentation. As will soon become apparent, this may be useful during reporting.

Figure 9:
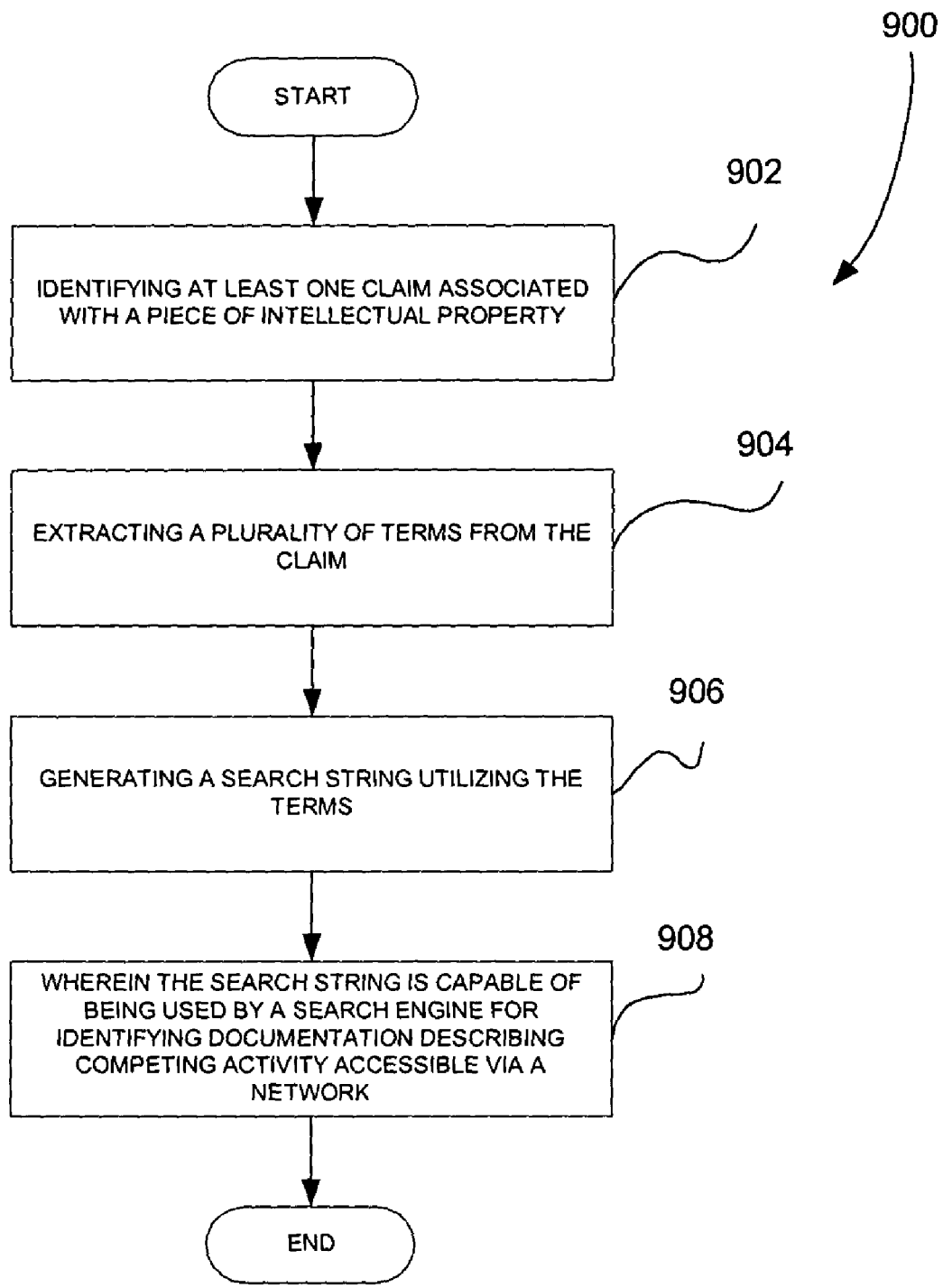
FIG. 9 illustrates a method for further facilitating the identification of the competing activity documentation, in accordance with one embodiment.

FIG. 9 illustrates a method 900 for further facilitating the identification of the competing activity documentation, in accordance with one embodiment. In particular, a technique is provided for generating a search string for collecting competing activity correlating with intellectual property. Initially, in operation 902, at least one claim associated with intellectual property is identified. As an option, this may be accomplished by one of the report functions to be set forth hereinafter. In the alternative, the text of the claim may be simply entered into a predetermined field or the like. Further, the text of the claim may be automatically retrieved from a database and inserted in the field.

Next, in operation 904, a plurality of terms are extracted from the claim. This may be accomplished in numerous ways. For example, only verbs and/or nouns may be extracted. Further, only repeated verbs and/or nouns may be extracted. The foregoing preferably occurs without any user interaction. As an option, a list of the extracted terms can be presented to a user to allow the user to add to or deleted from the list of proposed terms. Further, the user may be allowed to prioritize some or all of the terms in the list, e.g., placing the most important term first, the second most important term in the second position, and so on. As an option, terms repeated in the claims may be given a higher priority than other terms, including those repeated less often.

In operation 906, a search string is generated utilizing the terms. Such search string may include a plurality of terms with "AND" or other searching operators (i.e. <near>, <sentence>, etc.) therebetween. Further, certain key words such as "claim", "said", etc. may be deleted along with other legalese and numerical words, since such language is customary in all claims. As an option, a synonym database may be used to identify synonyms to be "ORed" with the associated original term. This may be used to increase the breadth of the search.

Such search string may be used by a search engine for identifying documentation describing competing activity accessible via a network. See operation 908. As an option, such search string may be automatically submitted to a predetermined search engine in response to entry of the claim or entry of a command. If the search terms have been prioritized, the search engine preferably gives more weight to the search terms with higher priority.

A thesaurus may be used to generate search queries using alternate words but retaining the meaning of the terms. Preferably, multiple searches are performed for each string generated in operation 906, each search using a different combination of terms/synonyms. This ensures that competing activity is not overlooked merely because of varying terminology.

Moreover, the search string may be automatically or manually modified based on the results of the search. For example, the terms may be used with <near>, <sentence>, or other more limiting operations (or operands) instead of the AND operator/operand. Alternatively, the terms themselves may be modified. By way of example, only repeated words may be used in the second try.

The process described above with respect to FIG. 9 may be performed upon user request, automatically upon occurrence of an event (such as entry of a new patent, a system wide order to perform a search for designated patents, etc.), at predetermined intervals (for automatic information gathering), etc.

FIG. 10 shows the manner in which a claim 1000 may be converted into a search string 1002. Further shown is the manner in which the search string 1002 may be modified to improve the search. Note search string 1004. Similarly, the modification may expand a shorter string to include more terms, as in a modification of string 1004 to string 1002.

FIG. 11 is a chart showing a data structure 1100 associated with the information collected, in accordance with one embodiment. As shown, the intellectual property identifiers are correlated to various technology categories, competing patents, and competing activity. Of course, various information may be stored in relation to each of these pieces of information to further enhance reporting. Further, the data structure 1100 may be reconfigured to show the various information as a function of technology categories, competing patents, and competing activity.

Reporting on the Correlation between the Intellectual Property and the Competing Activity (310)

One preferred method of organizing intelligence gathered from the foregoing sources is a technique referred to as "mapping." Mapping, in the present context, is a technique for correlating a company's patents with the patents and activities of other companies.

Mapping, if done properly, can provide vast insight into a patent portfolio, which in turn can be actively and strategically used to transform intellectual capital into patents that are well-positioned to effectively meet the defensive and offensive business objectives discussed earlier. For example, mapping can make the strengths and weaknesses of a patent portfolio immediately apparent. Three types of mapping will now be described, after which various techniques of utilizing such intelligence will be set forth.

Technology Mapping

Technology mapping refers to the process of organizing a patent portfolio via separation of the patents in that portfolio into multiple technology groups, thus giving insight into the strength of patent protection of a company in various technological areas. One easy way to conduct technology mapping is to classify patents in terms of the class assigned by a patent office. In order for technology mapping to be most effective, however, the technology groups should be chosen based on relevance to the business of the company and any competitors. Thus, it is best if the technology groups are manually selected. A company's product line and divisions are often the best places to begin identifying pertinent technological categories.

Once the technology groups have been selected, the patents in a patent portfolio may be categorized according to the most relevant technology group. Thus, the result of such technology mapping is an indication as to the number of patents in each of the technology groups. This information provides an immediate clue as to the strengths and weaknesses of a company's patent portfolio in terms of pertinent technological areas. Moreover, technology mapping can parse a large portfolio into a number of digestible portions, making it much more manageable.

Patent Mapping

Patent mapping provides a comparison of a company's patent portfolio with those of competitors. Patent mapping may take various forms. For example, each patent of a company's portfolio may be reviewed to identify patents referenced by a patent office examiner during prosecution, as well as other patents that reference the particular patent. This information is often referred to as forward and backward citing. Other types of queries may be used to locate related patents based on patent class, bibliographic information, etc. Again, publicly available databases are critical in gathering such patent intelligence.

Ideally, patent mapping involves not only issued patents, but also pending patent applications. While recently-filed patent applications are usually not available for competitor patent portfolios, it should be noted that patent applications are published under the Patent Cooperation Treaty (PCT) and under recent amendments to United States patent law. Such publications may give at least a glimpse of a competitor's current technological focus.

Patent mapping often aids in identifying competitors with research and development which overlaps that of a company. Further, such patent mapping provides information with which patent value may be determined or evaluated. For example, if a particular patent has been referenced by a large number of patents in a short time period, such patent is likely a pioneering-type patent representing a base technology from which other competitors are expanding. To this end, the "crown jewel" patents may be ascertained using the present form of patent mapping.

As mentioned above, patent mapping may take various forms. An alternative or supplementary type of patent mapping is more company-driven, as opposed to patent-driven like the foregoing technique. When conducting a company-driven patent map, one must first select several companies of interest. Once the companies of interest are identified, the patents of these companies must be identified.

With these competing patents in hand, they may be sorted into the technology groups selected during the technology mapping. This type of patent mapping may thus be used to "size up" the competition while identifying particular strengths or vulnerabilities with respect to a particular competitor. Further, the present technique provides insight into the patents in a specified area of technology.

If the results of the patent mapping are stored and presented in an appropriate medium, an intelligence information base may be afforded where all of a company's patents may be accessed, along with the patents of key competitors. One caveat to note is the potential liability under any notice of such patents and associated willful infringement. This risk may be weighed against the foregoing benefits, and procedures may be concurrently established to minimize such risk.

License Mapping

License mapping is perhaps the most valuable intelligence that can be used to increase the value of a patent portfolio. This intelligence primarily focuses on two types of information, a company's patents and patent applications, and the activities of competitors. Competitive market intelligence is vital for license mapping.

One way to approach license mapping involves a patent-by-patent review of a portfolio, whereby the activities of competitors that correlate with the technology covered by each patent are identified. Of course, the best way to identify the technology covered by each patent is to review the claims. For reasons that will soon become apparent, the market intelligence gathered during the course of the present mapping need not and should not only be those competing activities that are deemed to be infringing the claims of issued patents, but also competing activities that prove to correlate with the claims of pending patent applications.

Similar to patent mapping, license mapping provides information with which a value of a patent may be determined. If a particular patent has a large number of instances of correlating competing activities, such patent is likely to represent significant licensing potential. Further, such patents may likely be useful in a defensive situation in any effort to secure a company's freedom of action.

Figure 12:
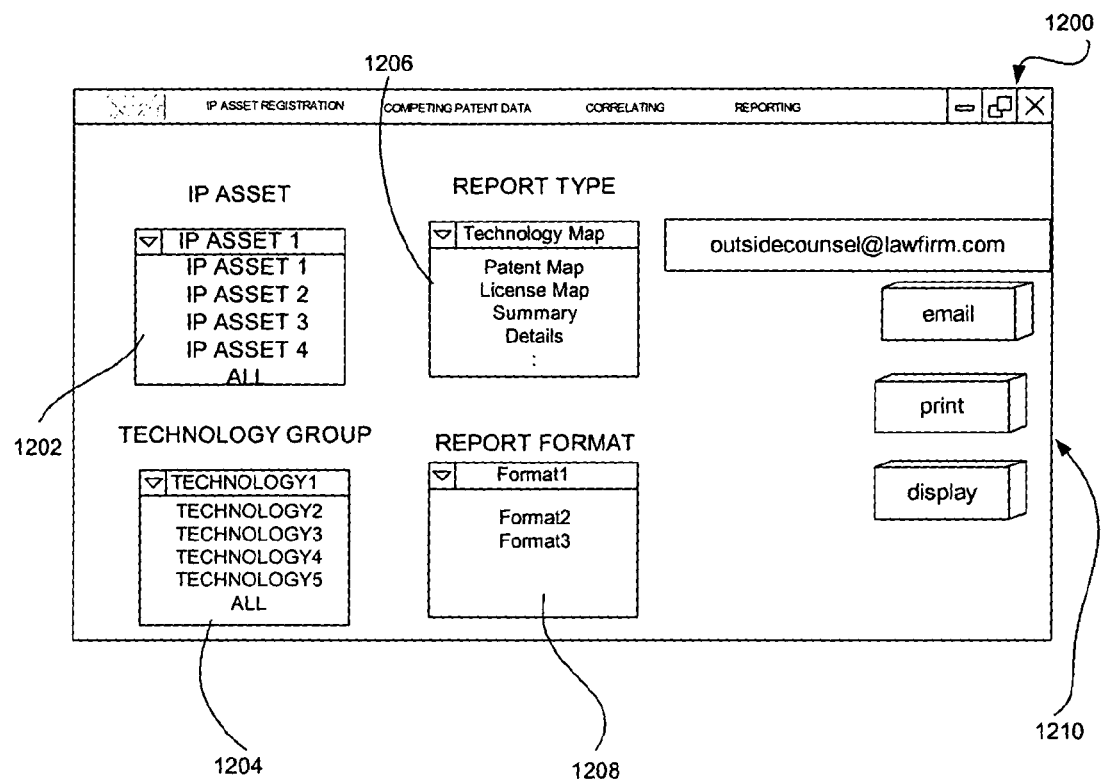
FIG. 12 illustrates an exemplary graphical user interface for defining a report utilizing collected competing activity documentation, in accordance with one embodiment.

FIG. 12 illustrates an exemplary graphical user interface 1200 for defining a report utilizing collected competing activity documentation, in accordance with one embodiment. While the current graphical user interface 1200 is designed for the purpose of defining a search, it should be noted that any other designs may be utilized per the desires of the user.

As shown, an intellectual property identifier pull-down window 1202 may be provided for selecting an existing intellectual property identifier, or all of the existing intellectual property identifiers. As shown, a technology category pull-down window 1204 may also be provided for selecting an existing technology category, or all existing technology categories.

As mentioned above, other designs of the graphical user interface 1200 can be used. For example, the identifiers and categories can be listed in scrollable windows rather than pull-down windows 1202, 1204. Thus, for example, the user can select particular items in the scrollable windows by holding down the CTRL key and selecting multiple items.

Once selected, a report type may be selected using a report type pull-down window 1206. Such report types may vary per the desires of the user. For example, such report types may include a technology map, a patent map, a license map, an inventor map, a mapping of the intellectual property firm that prepared any portion of the intellectual property documentation, or simply provide a summary or details pertaining to the selected intellectual property identifier and/or technology category. More information on such reports will be set forth hereinafter in greater detail.

As an option, a report format may be selected using a report format pull-down window 1208. Such format may include the use of different charts (i.e. pie chart, bar graph, etc.) or may organize the data in various ways. It should be understood that not only the format, but the reports themselves may be specifically configured per the desires of the user using the data of FIG. 11 in any desired manner.

Once selected and/or configured, the report may be printed, displayed, or emailed using the icons 1210 shown in FIG. 12. Other options (not shown) include saving the report to memory, etc.

Figure 13:
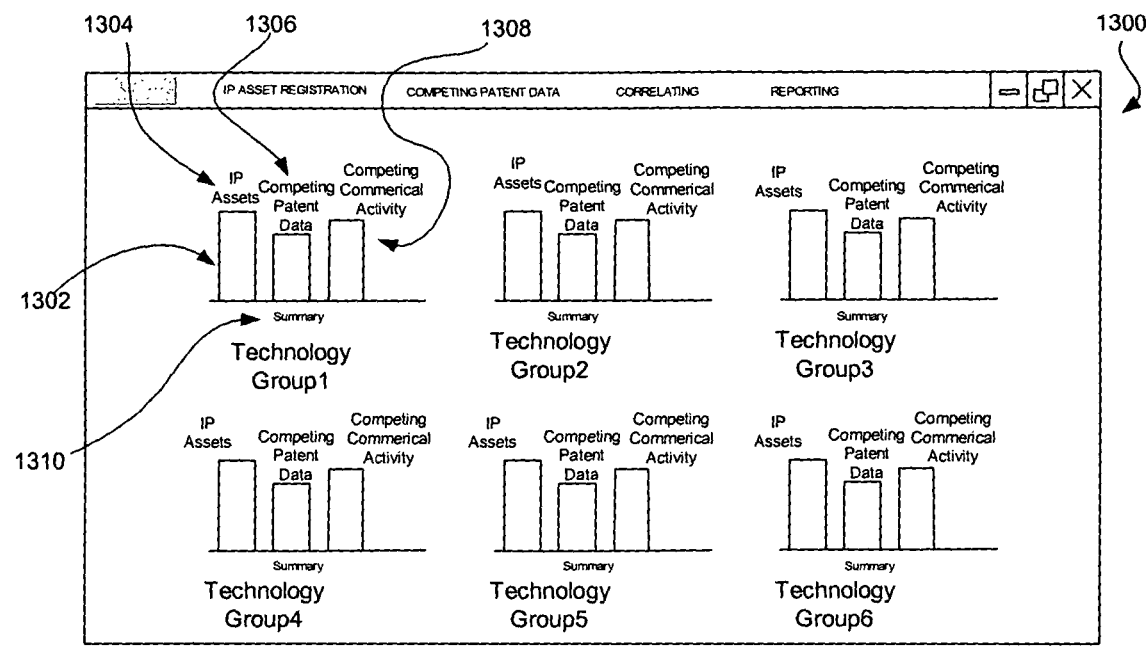
FIG. 13 illustrates an exemplary technology map report, in accordance with one embodiment.

FIG. 13 illustrates an exemplary technology map report 1300, in accordance with one embodiment. Such technology map report 1300 may be outputted in response to the selection of the technology map report using the report type pull-down window 1206 of FIG. 12, and selecting all of the categories using the technology category pull-down window 1204. Of course, fewer technologies may be selected for display per the desires of the user.

As shown, each technology group is represented with a plurality of bar graphs 1302 including a first bar 1304 for representing a number of intellectual identifiers associated with the particular technology group. Also included is a second bar 1306 indicative of a number of competing patents in the particular technology group. Still yet, another third bar 1308 is used to represent relatively the number of instances of competing activity in the particular technology group. Note that the graphs may be in another form, such as pie graphs, line graphs, etc. For reasons that will soon become apparent, a summary icon 1310 may also be provided.

As mentioned earlier, the various reports may be printed, emailed, and/or displayed. It should be noted that the electronic versions of the report (those that are displayed utilizing a computer) may include interactive features to further analyze the data by drilling down into selected areas. More information will now be set forth regarding a method with which this can be accomplished.

Figure 13A:
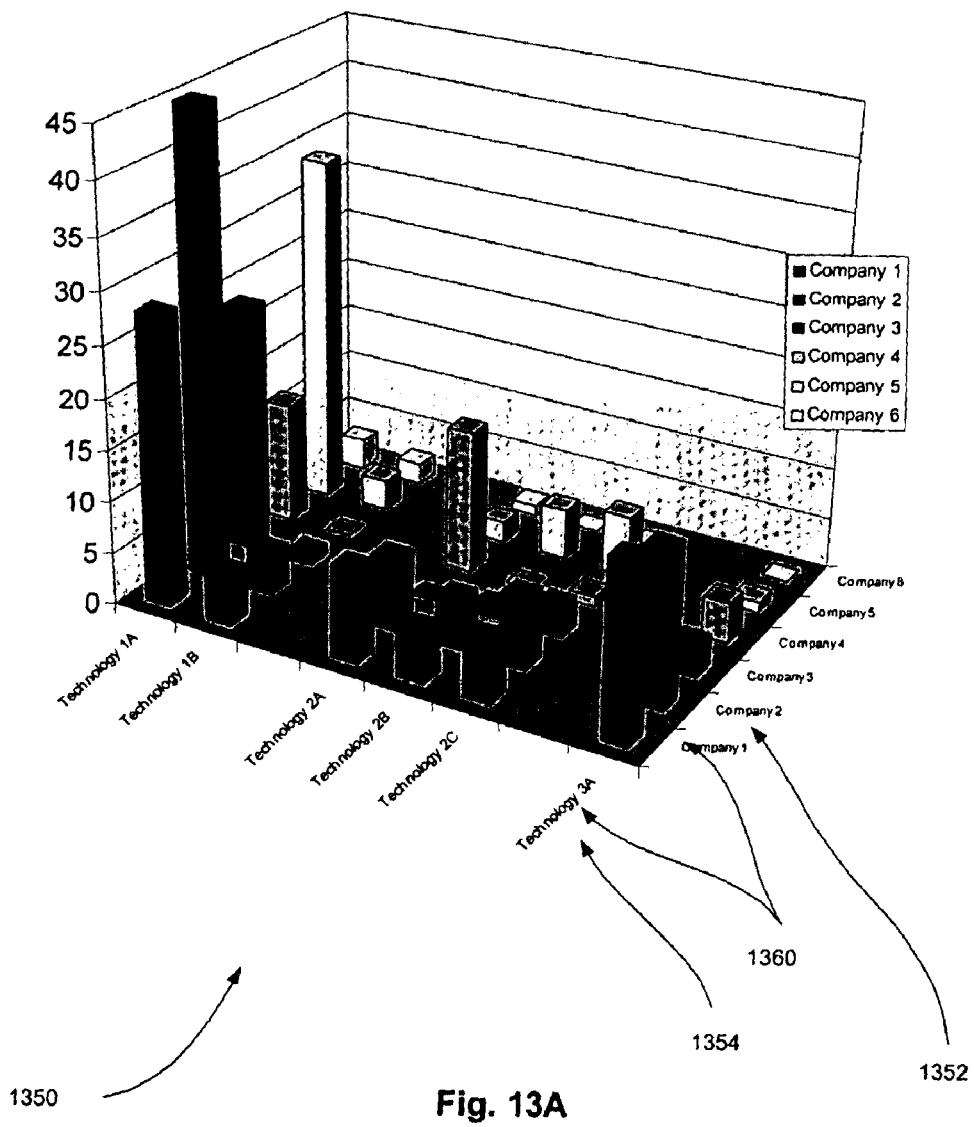

FIG. 13A illustrates another exemplary technology map report 1350, in accordance with a 3-D embodiment. Such technology map report 1350 may be outputted in response to the selection of the technology map report using the report type pull-down window 1206 of FIG. 12, and selecting all of the categories using the technology category pull-down window 1204. As an option, the technologies may optionally be arranged in subsets, as shown. The companies may be selected in a similar manner, or in any context desired.

As shown, a plurality of rows of bar graphs 1352 are included, which are each row of associated with a particular company. Also, included is a plurality of columns of the bar graphs 1352, which are each column is associated with a particular technology group. Of course, the foregoing columns and rows may be transposed. Note that the graphs may be in another form. Summary icons 1360 may also be provided.

As mentioned earlier, the various reports may be printed, emailed, and/or displayed. It should be noted that the electronic versions of the report (those that are displayed utilizing a computer) may include interactive features to further analyze the data by drilling down into selected areas. More information will now be set forth regarding a method with which this can be accomplished.

It should be noted that, in the context of the user interface 1350 of FIG. 13A, the selection of one of the "bars," summary icons 1360, or any other associated icon may first generate a 2-D graph corresponding with a horizontal or vertical slice of the 3-D graph of user interface 1350.

For example, upon the selection of Company2, a 2-D graph showing the IP assets of two companies [i.e. main Company1 (default) and Company2] may be shown side-by-side as set forth in the interface 1380 of FIG. 13B. In other words, the selection of one of the companies may produce a 2-D graph illustrating a comparison of two companies (the one selected and a default "client" company) in each of the technology groups, where the selection of one of the "bars" or corresponding icon may indicate a list of patents in such group, and further where the selection of one of the patents may produce specific information regarding such patent; in a manner similar to that will soon be set forth. Thus, such interface 1380 of FIG. 13B may then be "drilled-down" in a manner similar to that of IP Assets and Competing Patent Data graphics of FIG. 13, as will soon become apparent.

In a similar manner, it should be noted that the selection of a particular technology group may produce a 2-D graph illustrating a comparison of each of the companies in the specific technology group, where the selection of a "bar" or related icon may indicate a list of patents owned by such company in the particular technology group, and further where the selection of one of the patents may produce specific information regarding such patent; in a manner similar to that will soon be set forth.

Of course, the interface 1380 of FIG. 13B may be skipped by simply clicking the "bars" or related icon of the report 1350 of FIG. 13A.

Figure 14:
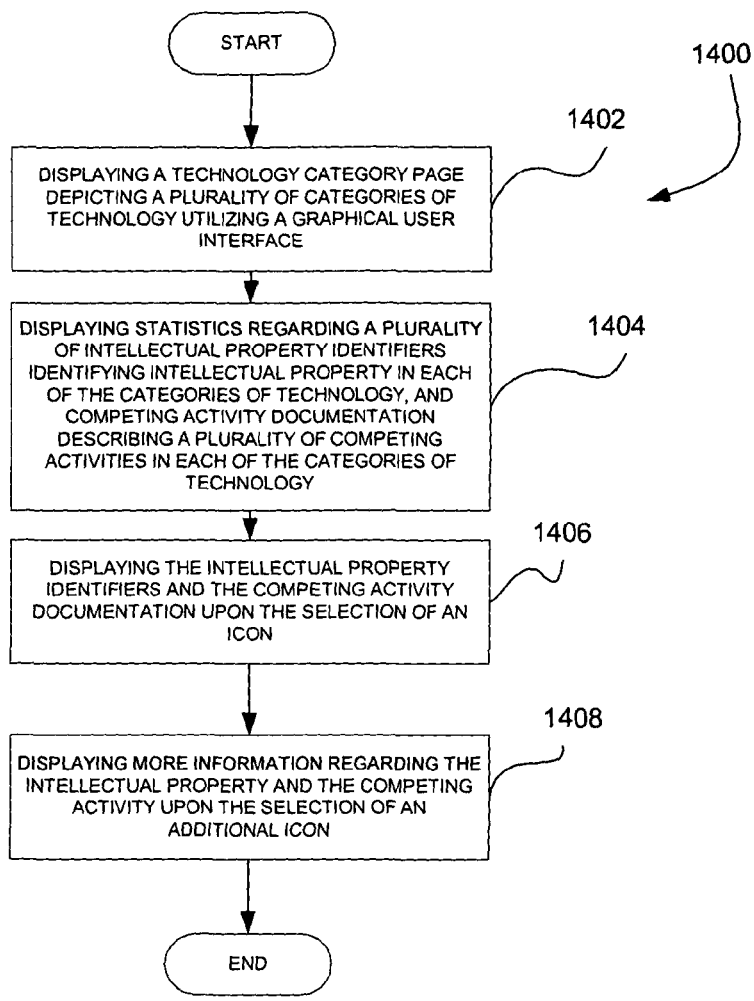
FIG. 14 illustrates method for providing a graphical user interface such as that of FIG. 13 which is equipped for reporting on strategic intellectual property management.

FIG. 14 illustrates a method 1400 for providing a graphical user interface such as that of FIG. 13 (or even that of FIGS. 13A-B) which is equipped for reporting on strategic intellectual property management. In operation 1402 a technology category page is displayed depicting a plurality of categories of technology utilizing a graphical user interface.

As set forth in the exemplary graphical user interface 1300 of FIG. 13, the technology category page includes statistics regarding a plurality of intellectual property identifiers identifying intellectual property in each of the categories of technology. Also included is competing activity documentation describing a plurality of competing activities in each of the categories of technology. Note operation 1404. Of course, as mentioned before, competing patent data may also be included.

In operation 1406, a user may be allowed to select a summary icon on the graphical user interface 1300. In use, such icon may act as a link to another page which sets forth additional information.

Figure 15:
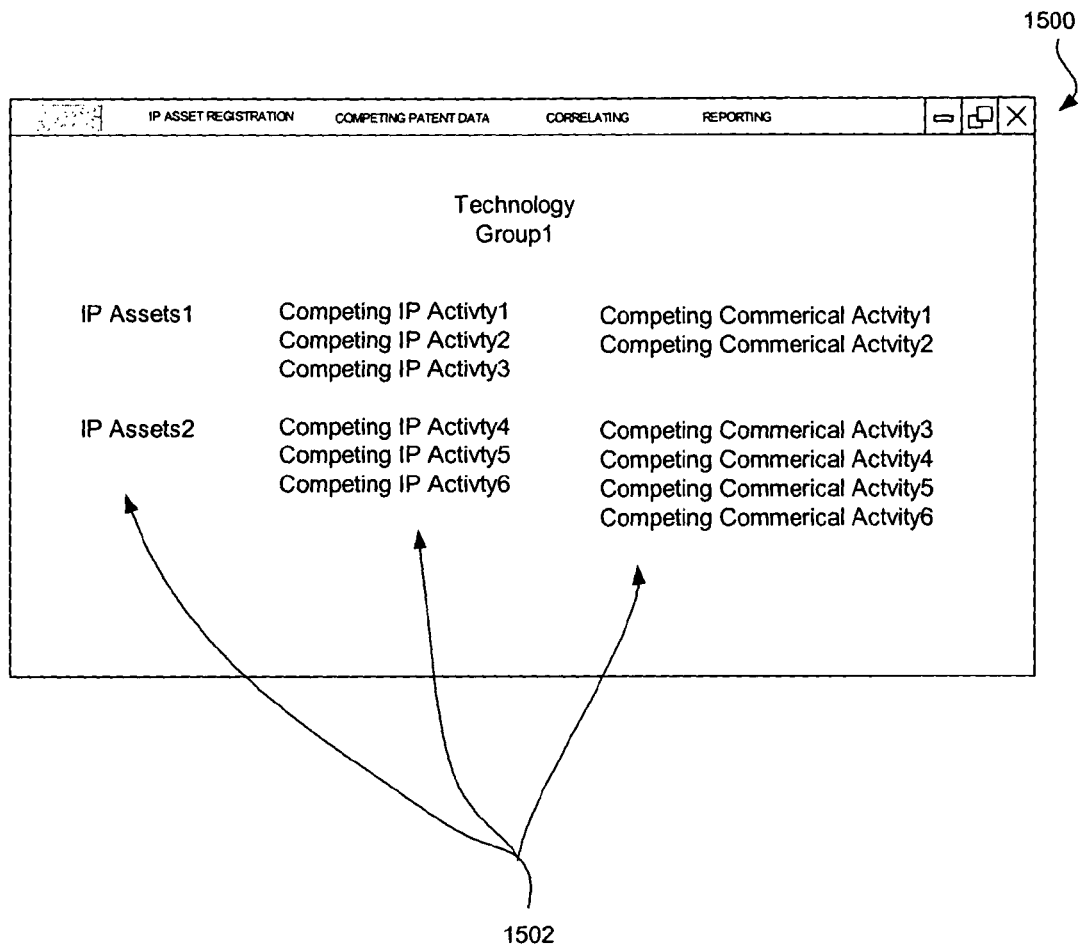
FIG. 15 illustrates an exemplary summary report, in accordance with one embodiment.

FIG. 15 illustrates an exemplary summary report 1500, in accordance with one embodiment. Such report 1500 may be displayed in response to the selection of the summary icon 1310 of one of the technology categories shown in the interface 1300 of FIG. 13. In the alternative, such page may be generated in utilizing the report definition interface 1200 by selecting a particular technology category via pull-down window 1204, selecting all of the intellectual property identifiers via pull-down window 1202, and selecting a summary format type. Of course, the summary report 1500 may be generated in any desired manner.

As shown, the summary report 1500 lists each of the intellectual property identifiers, each competing patent, and each instance of competing activity associated with the appropriate technology category. For reasons that will soon become apparent, each item in the lists 1502 may include a link to an additional page with more information.

In an alternate embodiment, an intellectual property identifier icon, competing patent icon, or a competing activity documentation icon may be selected separately. In such embodiment, the icons may include the bars 1304-8. Upon the selection of one such icons, only the intellectual property identifiers, competing patents, or competing activity documentation related to the particular technology category may be displayed, the intellectual property identifiers may be displayed. Note operation 1406.

With continuing reference to FIG. 14, more information may be displayed regarding the intellectual property, the competing activity, and the competing patents in response to a user request in operation 1408.

In particular, upon a user selecting one of the intellectual property identifiers in the lists 1502, more information relating to such intellectual property may be presented.

Figure 16:
FIG. 16 illustrates an exemplary intellectual property details report, in accordance with one embodiment.

FIG. 16 illustrates an exemplary intellectual property details report 1600, in accordance with one embodiment. As shown, a patent number, status, exemplary claim and figure, etc. may be provided in such report. It should be noted that such intellectual property details report 1600 may also be generated directly utilizing the report definition interface 1200 by selecting a particular intellectual property identifiers via pull-down window 1202, and selecting a details format type.

Of course, the details report 1600 may be generated in any desired manner.

Figure 17:
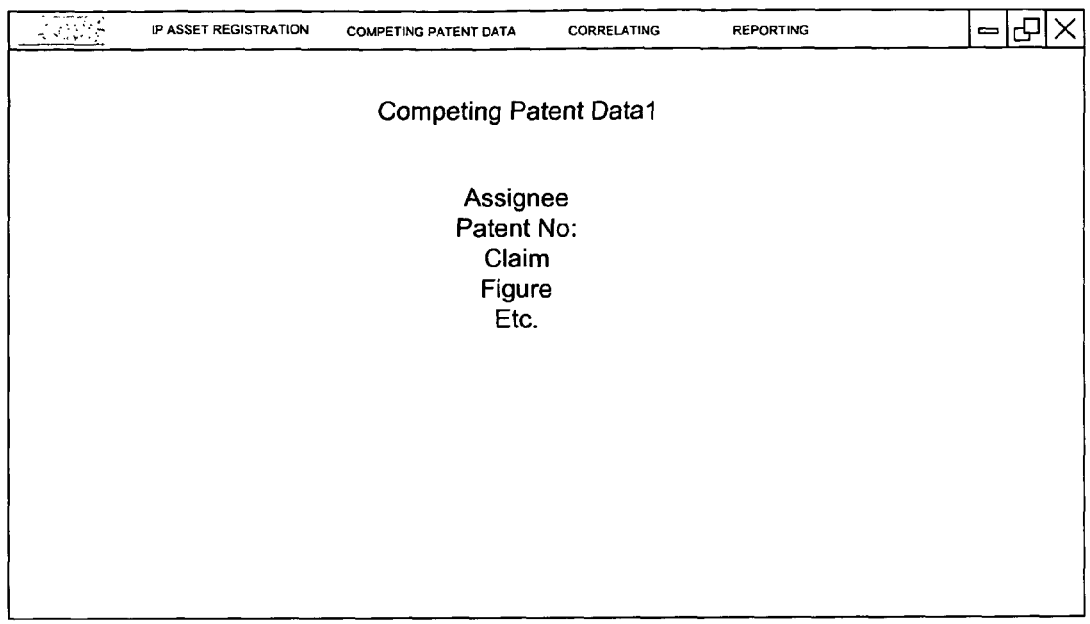
FIG. 17 illustrates an exemplary competing patent details report, in accordance with one embodiment.

Still yet, upon a user selecting one of the competing patents in the lists 1502, an assignee, patent number, status, exemplary claim and figure, etc. may be provided. FIG. 17 illustrates an exemplary competing patent details report 1700, in accordance with one embodiment.

Figure 18:
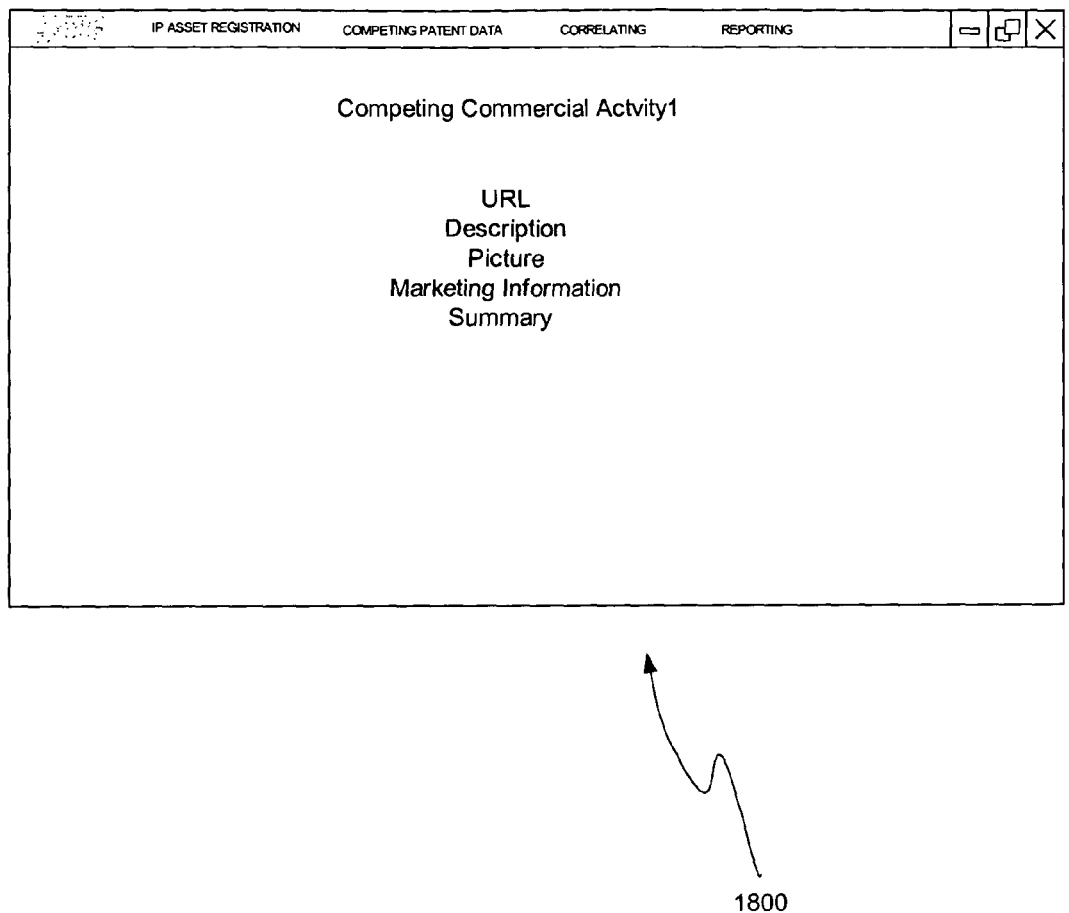
FIG. 18 illustrates an exemplary competing activity details report, in accordance with one embodiment.

The user may also select one of the instances of competing activity from the lists 1502 of FIG. 15. In response thereto, more information on such selected competing activity may be provided. FIG. 18 illustrates an exemplary competing activity details report 1800, in accordance with one embodiment. As shown, a URL/pointer, description, picture, marketing information and/or textual summary may be provided which were earlier archived. As an option, the URL/pointer may be linked directly from the report 1800.

Figure 19:
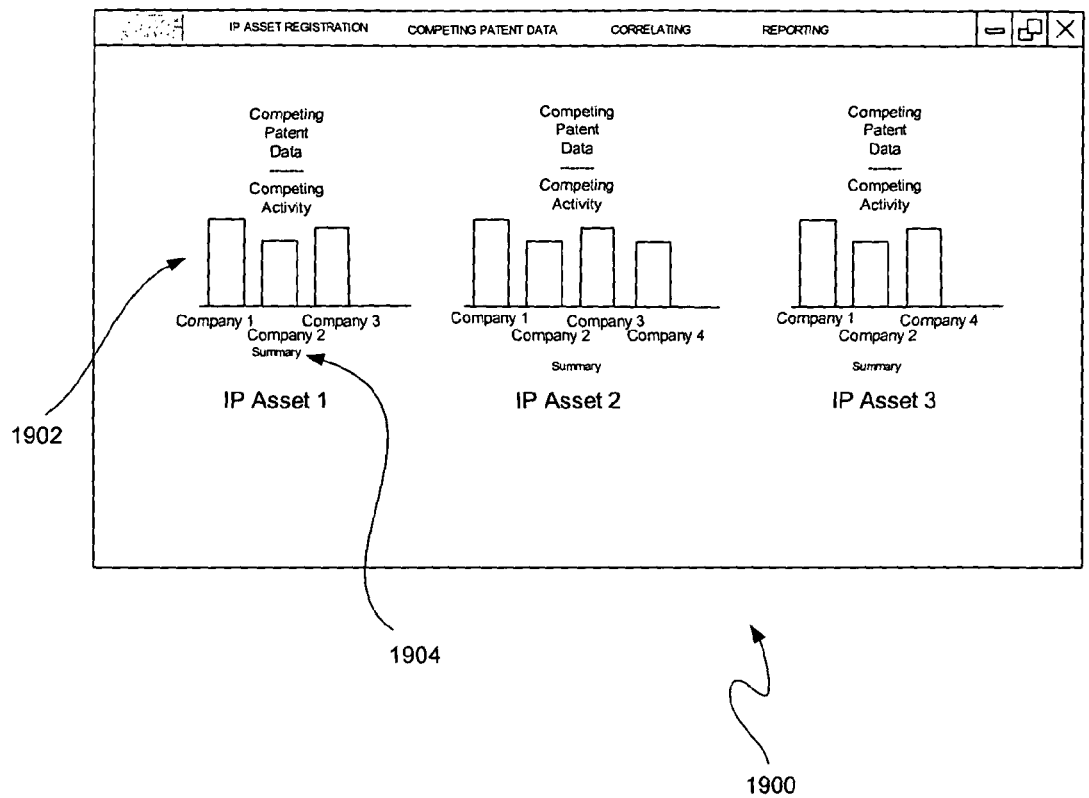
FIG. 19 illustrates an exemplary patent/license map report, in accordance with one embodiment.

FIG. 19 illustrates an exemplary patent/license map report 1900, in accordance with one embodiment. Such patent/license map report 1900 may be outputted in response to the selection of the patent or license map report using the report type pull-down window 1206 of FIG. 12, and selecting all of the intellectual property identifiers using the intellectual property identifier pull-down window 1202. Of course, fewer intellectual property identifiers may be selected per the desires of the user.

As shown, each intellectual property identifier is represented with a plurality of bar graphs 1902 including a plurality of bars each representative of a particular company that may be considered a competitor to the user. Further, a size of each bar may represent a number of competing activities or competing patents associated with the particular intellectual property identifier. In the case of the selection of the patent map report using the report type pull-down window 1206, such size of each bar may represent a number of competing patents. In the case of the selection of the license map report using the report type pull-down window 1206, such size of each bar may represent a number competing activities. Of course, both may be displayed simultaneously if desired by the user, and the size of the interfaces permits the same. Similar to the report 1300 of FIG. 13, a plurality of summary icons 1904 may be included.

Figure 20:
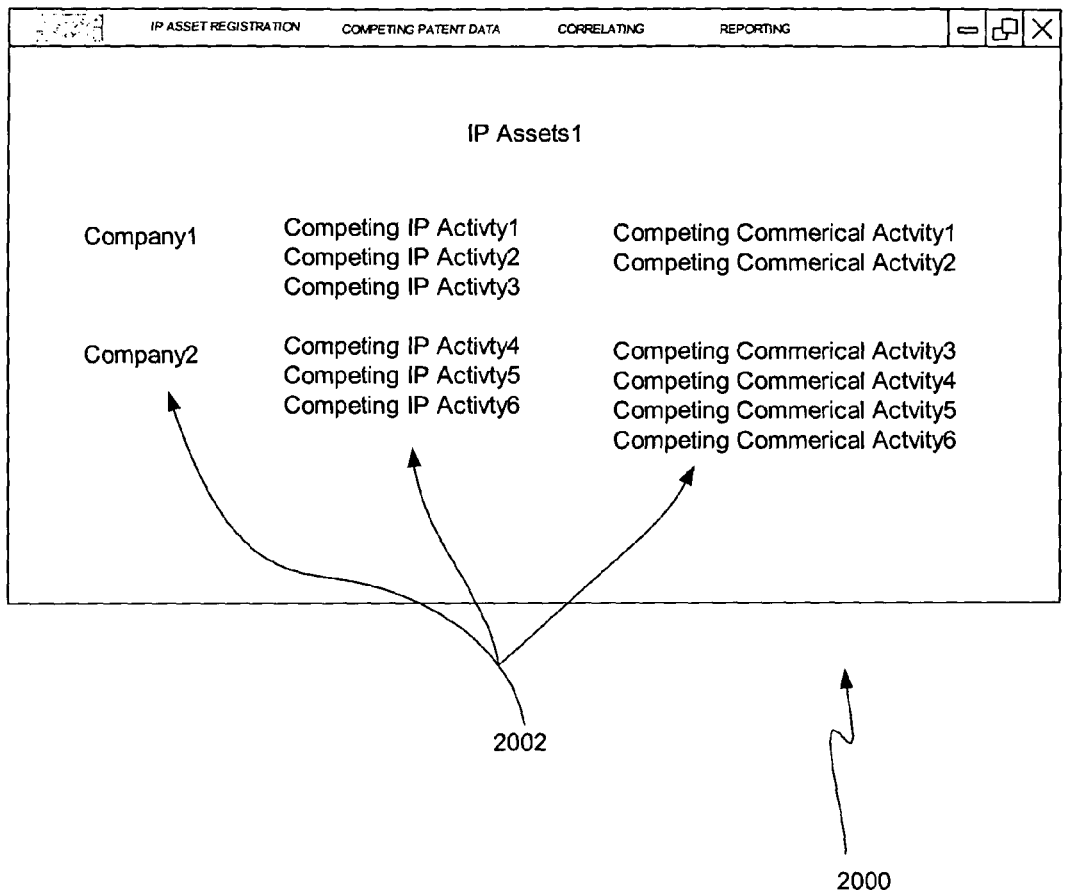
FIG. 20 illustrates an exemplary summary report, in accordance with one embodiment.

FIG. 20 illustrates an exemplary summary report 2000, in accordance with one embodiment. Such report 2000 may be displayed in response to the selection of the summary icon 1904 of one of the technology categories shown in the interface 1900 of FIG. 19. In the alternative, such page may be generated in utilizing the report definition interface 1200 by selecting one of the intellectual property identifiers via pull-down window 1202, and selecting a summary format type. Of course, the summary report 2000 may be generated in any desired manner.

As shown, the summary report 2000 lists each of competing company along with the corresponding competing patents, and competing activity thereof. For similar reasons as before, each item in the lists 2000 may include a link to an additional page with more information.

As one option, selected details displayed on the details report may be retrieved from the Electronic Business Center of the United States Patent and Trademark Office. Such details can include filing date, current status, file history in the Office, and/or any other information retrievable from the Electronic Business Center.

Figure 21:
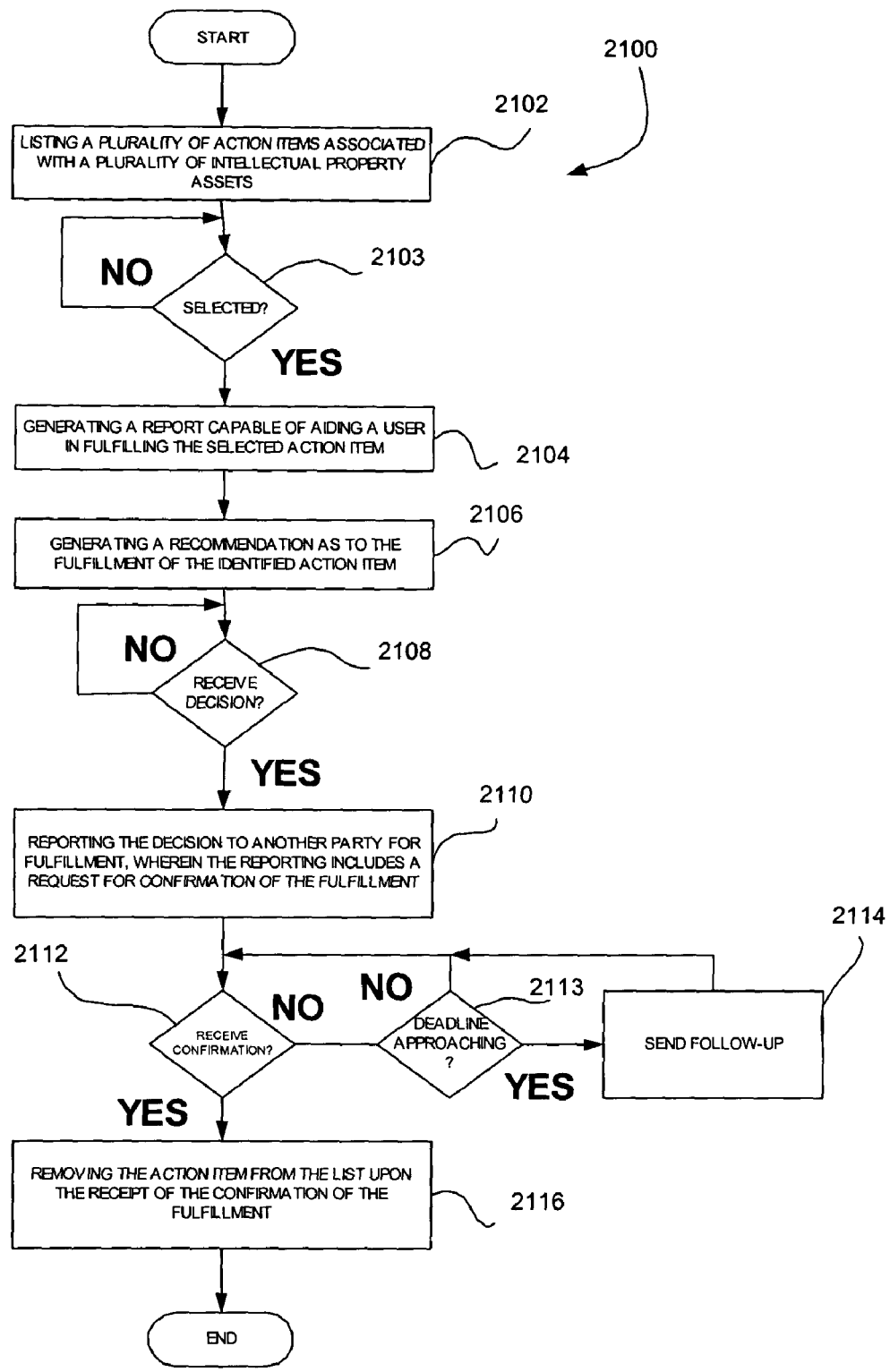
FIG. 21 illustrates a method for strategic intellectual property management utilizing a computer-implemented system, in accordance with one embodiment.

FIG. 21 illustrates a method 2100 for strategic intellectual property management utilizing a computer-implemented system, in accordance with one embodiment. As an option, the present method 2100 may be implemented in the context of the foregoing architecture and techniques. Of course, however, the present method 2100 may be implemented in any desired context.

Initially, a plurality of action items associated with a plurality of intellectual property assets are listed or otherwise displayed in any desired manner. Note operation 2102. It should be noted that the action items may be generated utilizing a docketing database, like the one mentioned above. For example, the action items may include taking an invention disclosure, filing a patent application, filing an information disclosure statement for a patent application, foreign filing a patent application, responding to an office action for a patent application, paying an issue fee for a patent application, filing a continuation patent application for a previous patent application, and/or paying a maintenance fee.

Figure 22:
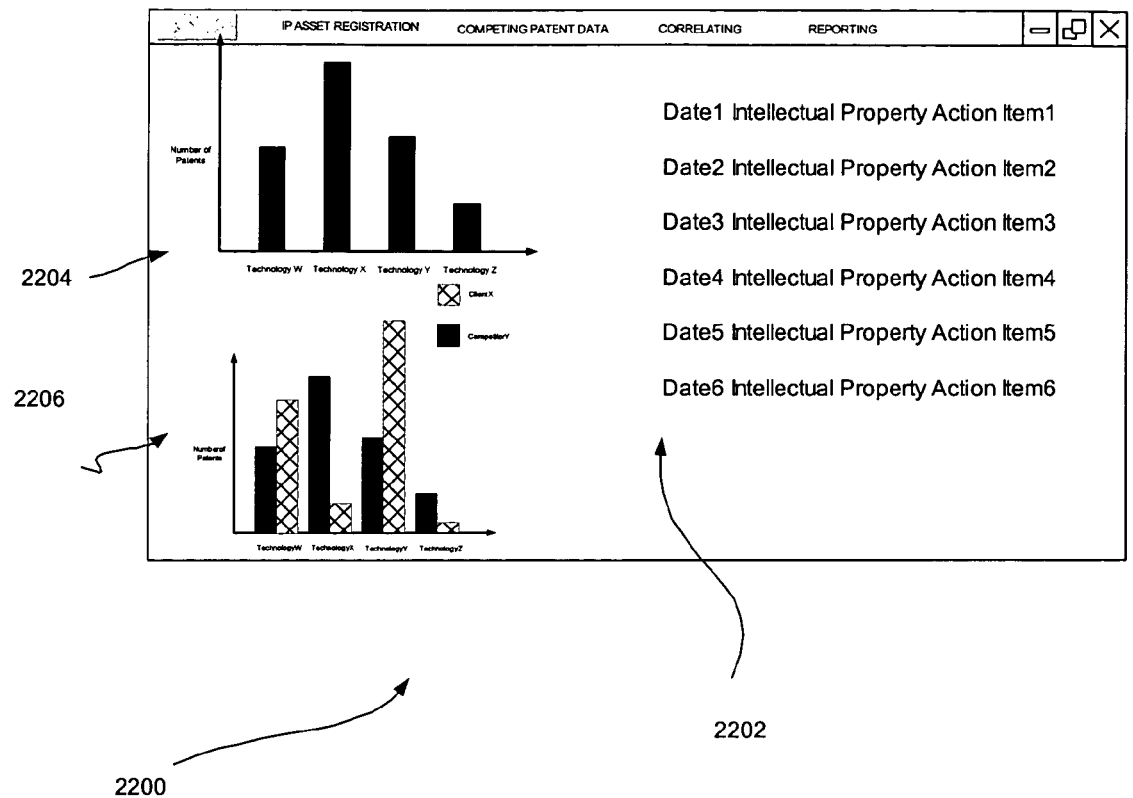
FIG. 22 illustrates a sample graphical user interface for listing a plurality of upcoming action items.

While this may be accomplished in any desired manner, more information regarding one exemplary way of displaying such action items will be set forth during the description of FIG. 22.

Next, in decision 2103, it is determined whether any of the action items has been selected. This may be accomplished in any desired manner (i.e. a mouse click, etc.). Once selected, a report capable of aiding a user in fulfilling the selected action item is displayed, as indicated in operation 2104. While this may be accomplished in any desired manner, more information regarding one exemplary way of such reporting will be set forth during the description of FIG. 22.

Moreover, a recommendation is generated as to the fulfillment of the identified action item. Such recommendation may be based on any desired combination of factors. For example, it may be based on a technology mapping, citation mapping, patent mapping, license mapping, a rating, and/or any other type of business logic. As mentioned earlier, a database of such ratings, business logic, as well as other information may be made available for such purpose. Still yet, the recommendation may use Boolean logic or even user-configured logic to generate the appropriate recommendation. For example, a user may indicate that any patent application with a rating lower than X "AND" which is in a technology group where, quantitatively, a company already has more foreign patent applications than a list of key competitors (as determined by a real-time search in a database of foreign patents) will render a recommendation of "NOT FOREIGN FILING."

Next, in decision 2108, it is determined where a decision as to the fulfillment of the identified action item has been received from the user. Of course, the user may base such decision on the report and the recommendation, which was generated automatically, on-the-fly using the latest information from the integrated databases (i.e. docketing, competitive patent database, etc.

Once received, the decision is reported to another party (i.e. outside counsel, junior attorney, etc.) for fulfillment. This, of course, may be accomplished in any desired manner. For example, an automatically generated e-mail may be sent. While this may be accomplished in any desired manner, more information regarding one exemplary e-mail will be set forth during the description of FIG. 24.

As an option, the reporting may include a request for confirmation of the fulfillment. Thus, upon receipt of a confirmation (see decision 2112) such action item may be removed from the list in operation 2116. If, however, a confirmation is not received just prior to the deadline (i.e. any desired threshold time period), as determined decision 2113, a follow-up report may be sent in operation 2114.

FIG. 22 illustrates a sample graphical user interface 2200 for listing a plurality of upcoming action items 2202. As an option, such graphical user interface 2200 may be used in the context of operation 2102 of FIG. 21. Of course, however, such interface 2200 may be used in any desired context.

In one embodiment, the action items may be listed in chronological manner. An associated deadline date may even be displayed. It should be noted that the graphical user interface 2200 may serve as a "central" management interface. In such case, a plurality of general statistical data may be included on such interface 2200. For example, a general "high-level" patent map 2206 or technology map 2204 may be included, as shown, or in any desired manner. Such patent map 2206 or technology map 2204 may include all of the patents in all of the technology groups associated with a company.

Figure 23:
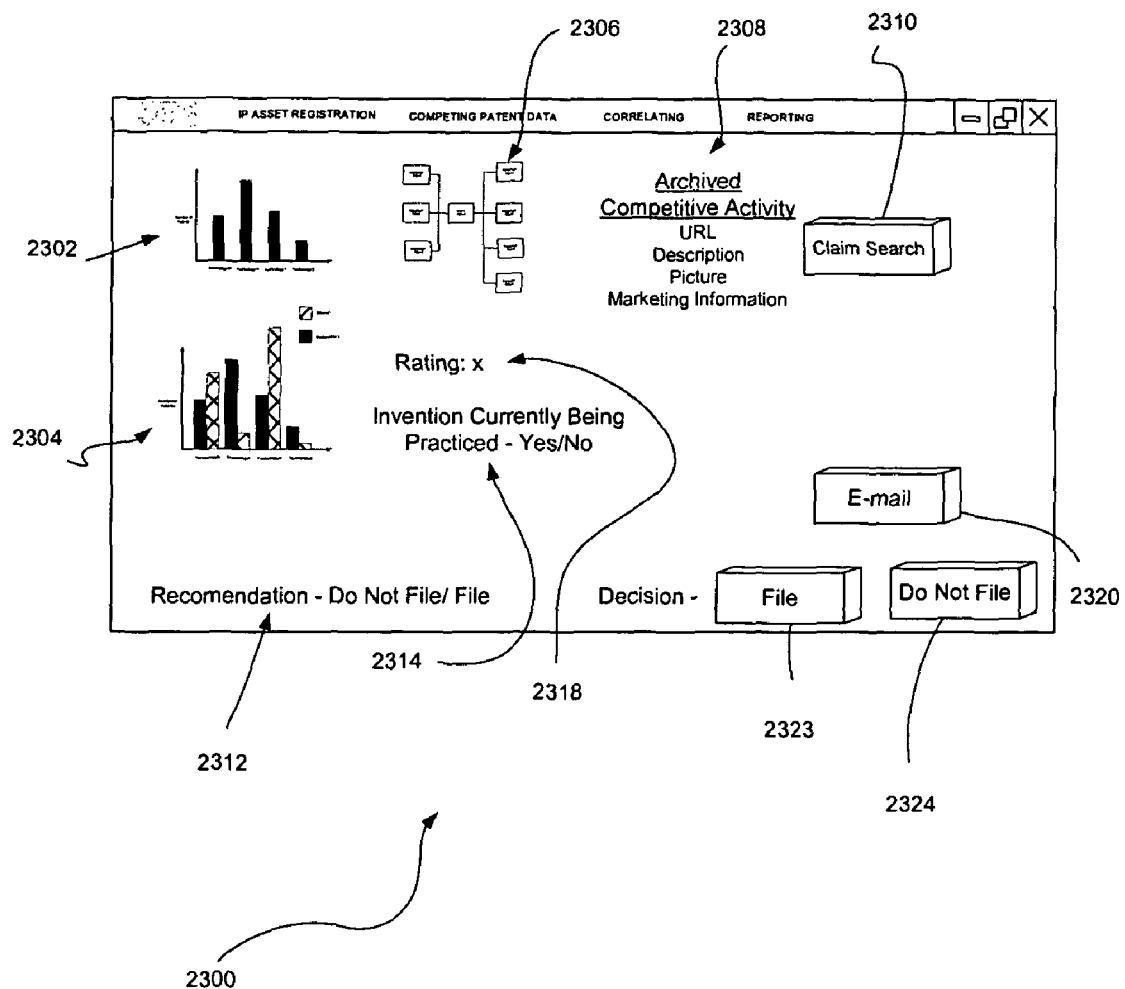
FIG. 23 illustrates a sample graphical user interface for reporting information relative to an upcoming action items.

FIG. 23 illustrates a sample graphical user interface 2300 for reporting information relative to an upcoming action items. As an option, such graphical user interface 2300 may be used in the context of operation 2102 of FIG. 21. Of course, however, such interface 2104 may be used in any desired context.

As shown, various reports may be provided including, but not limited to a patent map 2304, technology map 2302, a citation-tree 2306, any archived competitive activity 2308 (see, for example, FIG. 18), an indication 2314 as to whether the invention is currently being practiced by the assignee company (note: this could be retrieved from one of the business logic databases, etc.), a rating 2318 associated with the patent application/patent. Moreover, a search button 2310 may be provided for conducting an Internet search to determine whether the invention is being practiced by competitors. As an option, this may be accomplished using the query generator of FIGS. 9-10. Still yet, a recommendation 2312 may be provided, which may be calculated in the aforementioned manner. To carry out the decision 2108 of FIG. 21, a pair of buttons 2323 and 2324 are provided. Optionally, any portion of any of the reports may be e-mailed to other parties via an e-mail button 2320.

A plurality of different reports is disclosed in graphical user interface 2300. It should be noted, however, that different information may be reported based on and specific to the specific action item at issue. Following are examples of various combinations of different reports which may be issued as a function of the action item.

In one embodiment where the selected action item includes filing a first-filed patent application, the report may include at least one of 1) rating and 2) a patent map including pending patent applications and issued patents of at least two companies. In one specific embodiment, the present patent map may show the relative quantitative strength of patents (and possibly patent applications) of a variety of competitors (as possibly defined by the aforementioned business logic database) in a variety of technology groups (also possibly defined by the aforementioned business logic database). Of course, any desired recommendation (based on user defined logic or possibly not) may be listed to facilitate the decision.

In another embodiment where the selected action item includes filing an information disclosure statement for a patent application, the report may include a patent map associated with a technology group in which the patent application resides. In one specific embodiment, immediate access may be given to the patents of such patent map (i.e. via the aforementioned drill down technique, or the like); such that the patents requiring to disclose to the patent office in an information disclosure statement may be identified. Of course, any desired recommendation (based on user defined logic or possibly not) may be listed to facilitate the decision.

In other words, a patent report may be automatically be outputted in response to an information disclosure date deadline (i.e. 3 months from a filing date of a patent application, etc.). Such patent report may further include all of the patents in the same technology group as the subject patent application, based on a patent mapping. Still yet, the format of such report may take on a specific format (i.e. FORM 1449, etc.) that allows convenient submission to the United States Patent Office. Again, the report may be automatically sent (by email, etc.) to an attorney/agent responsible for the case associated with the particular intellectual property identifier. Such attorney/agent may be in-house or outside counsel. As yet a further option, electronic copies (i.e. PDF-versions, etc.) of the actual patents may also be sent. This feature thus ensures that the applicant adheres to his or her duty of disclosure under the knowledge of the patents collected during a patent mapping effort.

In still another embodiment where the selected action item includes foreign filing a patent application, the report may include at least one of 1) a patent map including foreign patents of at least two companies, and 2) a rating.

For example, a report may be generated to indicate a rating for a particular patent application. This rating may be based on a number of competing patents in the associated technology group. Still yet, such rating may be based on a number of international patents in a particular associated technology group. Even still, a number of associated licensing hits may factor into such rating. In any case, such rating may be automatically sent to the appropriate person some time before the one-year foreign filing deadline following the patent application filing date. Thus, the intelligence provided by the present system may be used to more intelligibly file foreign patent applications.

In cases where the application was filed under a consolidation treaty (i.e. patent cooperation treaty—PCT), the patent application may be similarly rated as to where it should be filed under a national phase, or whether there should be a national phase filing at all. In the present case, the rating may be factored based on a number of competing foreign patents in a particular technology group. For example, if a primary competitor has more than a threshold number of patents of a similar technology in a particular country, the aforementioned rating may be high. As an option, the threshold may be governed by a comparison of a number of company patents versus a number of competing patents.

In still yet another embodiment where the selected action item includes paying an issue fee for a patent application, filing a continuation patent application, or paying a maintenance fee; the report may include at least one of 1) a license map, 2) a citation map, 3) a rating, and 4) search results. Of course, any desired recommendation (based on user defined logic or possibly not) may be listed to facilitate the decision.

In still another example, a competing activity report or any other desired reports may automatically be outputted in response to a docketed patent issue date arriving. This may trigger a licensing effort or the like.

As is apparent from these specific examples, the competing activity report and/or other reports may be generated based on occurrences of a docketing system/file and further utilizing information stored therein. In one additional embodiment, the format, destination, use, etc. of the report may vary based on the status, any docketed dates, or any other docketing system/file information associated with the intellectual property identifier.

As an option, the reports may take the form of alerts based on a current status of the database (see, for example, FIG. 11), user-configured rules or thresholds, and even the docketing system. For example, a user may designate a Company x. If a number of patents of Company x ever exceeds a company's patents in any technology area, an alert (i.e. HTML, e-mail, SMS, etc.) may be issued to a user. Of course, any threshold or rule may be used (i.e. percentage based, formula-based, etc.). In one embodiment, the alert may identity the competing company, the technology area, and the rule or threshold that was triggered. These alerts may be used in various ways. Just by way of example, the foregoing alert may be prompt a user to file additional patent applications in the pertinent technology area.

In use, the foregoing versatile reporting framework may be employed to increase the value of a patent portfolio and further aid in the exploitation thereof. For example, competing activity and competing patent information may be used to determine in which areas invention disclosures should be taken, and further which invention disclosures should be filed as patent applications. Reports on the competing activity may also be used during the prosecutions of patent applications in order to ensure that claims not only define patentable subject matter, but also read on the competing activity. Still yet, the reports on the competing activity may be used to exploit issued patents in the form of licensing initiatives and the like. Further, the framework and reports may be used to assist a company in avoiding infringement of intellectual property rights and/or payment of licensing revenues by allowing them to gather, track, and examine potential adverse rights.

Additional information will now be set forth regarding the various ways the intelligence set forth hereinabove may be used to increase the value of a patent portfolio.

Strategically Selecting Disclosures to File for Patent Protection

Using the various mappings, a company can level the playing field with competitors by filling any gaps in a patent portfolio. When filtering invention disclosures to select those to file, for example, the technology mapping may be used to determine whether a patent on a particular disclosure would bolster patent protection in a technology area in which the company has few patents and patent applications. Moreover, this technique may be used to ensure market dominance in desired technology areas or identify opportunities for patent monopolies in unexplored technology groups. Further, by examining competing patent groupings, a company can determine whether it is falling behind in a particular area. Still yet, the present technique may be used to avoid patenting the same invention or minor variations thereof more than once.

Strategically Selecting Continuation Patent Applications

As mentioned earlier, the licensing map effectively identifies the crown jewel patents of a company. If such identification takes place before a patent has issued, this intelligence may warrant a continuation filing. By maintaining the pendency of such patent applications, maximum value may be extracted from the patent application by filing additional claims, broadening existing claims to ensure literal infringement, etc.

Increasing the Value of Already Pending Patent Applications

After conducting a licensing map, the resulting market intelligence may be used during patent prosecution to add claims that cover the newly identified activities. Thus, a patent application may be aligned with competitor activity, thus increasing the value of such patent application when it issues. In light of potential estoppel issues, it is preferred that claims only be added, as opposed to being amended.

Also, such market intelligence may be used when responding to an office action issued by a patent examiner. Traditionally, only the claims and prior art are the subject of attention when responding to an office action. By introducing a third element, market intelligence, claims can be amended in a manner which ensures that a more valuable likely-to-be-infringed patent issues as opposed to claims prosecuted in a vacuum.

Accelerating the Examination of Patent Applications

After conducting a licensing mapping, pending patent applications identified as being infringed may be eligible for accelerated examination by filing a petition to make special under 37 CFR 1.102 and 37 CFR1.496[3]. One caveat to such practice is that a patent practitioner should determine whether the evidence indicates that the competitor activity is prior art. If this is the case, an information disclosure statement should be filed rather than a petition to make special.

Conducting a Licensing Initiative

Using the market intelligence gathered during license mapping, licensing opportunities may be brought to light. Such intelligence may be used as a starting point in generating revenue through a licensing initiative.

Litigation Support

With the various mappings established and actively being used during patent procurement, a knowledge base is created that may be used to analyze and gather information about a portfolio for a variety of additional purposes. For example, the licensing mapping may be used to identify patents to be used defensively if confronted with one or more patents of a competitor in a litigation context. The patent mapping may also be used to "size up" a company from whom licensing revenue is being sought.

Figure 24:
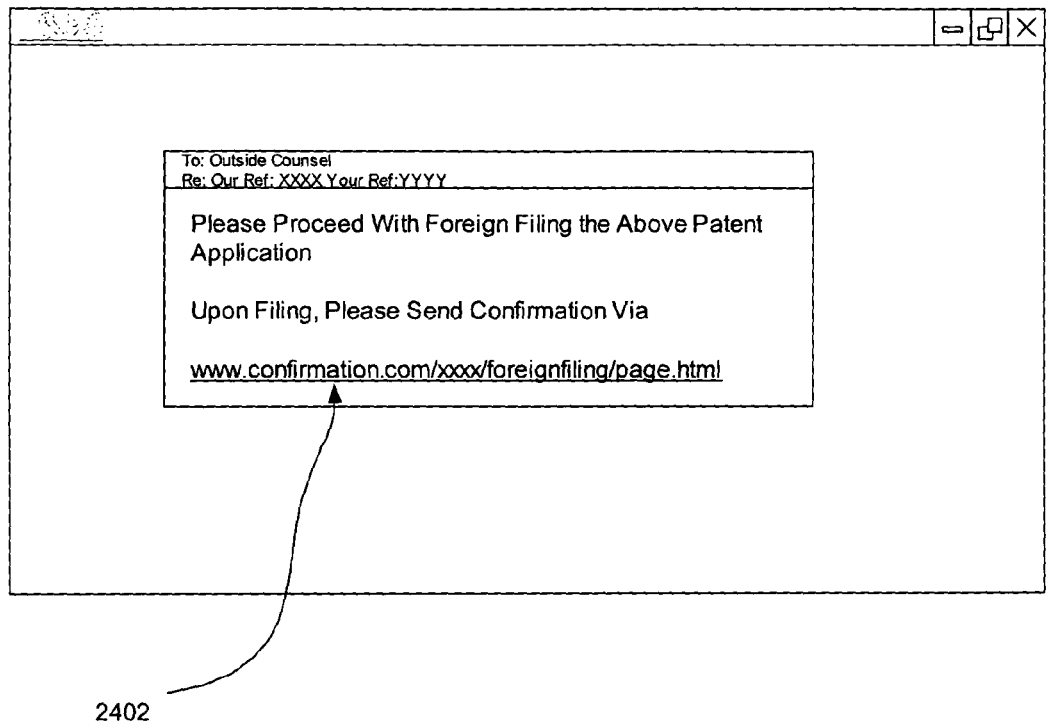
FIG. 24 illustrates a sample e-mail that may be used to report a decision as to an intellectual property action item for fulfillment, in accordance with one embodiment.

FIG. 24 illustrates a sample e-mail 2400 that may be used to report a decision as to an intellectual property action item for fulfillment, in accordance with one embodiment. As an option, such e-mail 2400 may be used in the context of operation 2110 of FIG. 21. As a further option, the e-mail 2400 may also represent the follow-up e-mail of operation 2114 of FIG. 21. Of course, however, such e-mail 2400 may be used in any desired context.

As shown, the e-mail 2400 may include a link for allowing the recipient of the e-mail 2400 to indicate whether the action item has been fulfilled. While a link is shown, it should be noted that a reply e-mail may be set with such indication or the link. Upon receipt of the replay e-mail or the link is used to indicate fulfillment of the action item, the system is capable of removing the associated action item off the list.

While various embodiments have been described above, it should be understood that they have been presented by way of example only, and not limitation. For example, any of the network components may employ any of the desired functionality set forth hereinabove. Thus, the breadth and scope of a preferred embodiment should not be limited by any of the above-described exemplary embodiments, but should be defined only in accordance with the following claims and their equivalents.

What is claimed is:

1. A method for organizing patents utilizing a computer-implemented system, comprising:
  displaying a notes field for receiving manually entered notes including text;
  receiving the manually entered notes, utilizing the notes field;
  storing the manually entered notes in association with at least one identifier, thus associating the manually entered notes with the at least one identifier;
  receiving a manual selection of a file;
  storing the manually selected file in association with the at least one identifier by providing a correspondence between the file and the at least one identifier, thus associating the manually selected file with the at least one identifier, wherein a manually selected first file is associated with a first identifier corresponding to a single patent, and a manually selected second file is associated with a second identifier corresponding to a group involving a plurality of patents; and
  associating a plurality of patents with the at least one identifier;
  wherein the manually entered notes, at least one of the manually selected files, and the patents are accessible by subsequent selection of the at least one identifier;
  wherein the notes field allows a user to cut and paste notes;
  wherein the file is selected utilizing a file structure field including a file tree-structure that allows a user to browse various folders where files have been previously stored, where the file structure is displayed simultaneously with the notes field on a same interface, the file selected utilizing the file tree-structure including information from a source separate from the patents;
  wherein the patents associated with the at least one identifier are identified by searching a database including a comprehensive database of all patents issued by at least one government agency;
  wherein a set of the patents is reported by:
    displaying a technology mapping depicting a plurality of categories of technology utilizing a graphical user interface,
    displaying statistics regarding a number of the patents of the set in each of the categories of technology in a first interface,
    displaying first additional information associated with at least a portion of the patents of the set in a second interface separate from the first interface upon the selection of an icon positioned in the first interface and associated with one of the statistics, for drilling down from the first interface to the second interface, wherein the first additional information includes a list of the patents of the set associated with one of the categories of technology,
    displaying second additional information associated with at least one of the patents of the list in a third interface separate from the first interface and the second interface upon the selection of an additional icon positioned in the second interface and associated with one of the patents, for drilling down from the second interface to the third interface, wherein the second additional information includes at least one of a patent number, a status, an exemplary claim, and an exemplary figure;
  wherein the notes and at least one of the files are made accessible to other parties utilizing e-mail;
  wherein said method is carried out utilizing the computer-implemented system including computer code embodied on a computer readable medium.

2. A non-transitory computer-readable medium encoded with an intellectual property data structure for realizing a function of organizing and reporting information associated with an identifier, comprising:
  an identifier object;
  a notes object correlated with the identifier object for tracking manually entered notes including text associated with the identifier object; and
  at least one patent object correlated with the identifier object for tracking a plurality of related patent identifiers associated with the identifier object;
  wherein a set of the patents is reported utilizing the computer readable medium with:
    computer code embodied on the computer readable medium for displaying a technology mapping depicting a plurality of categories of technology utilizing a graphical user interface,
    computer code embodied on the computer readable medium for displaying statistics regarding a number of the patents of the set in each of the categories of technology in a first interface,
    computer code embodied on the computer readable medium for displaying first additional information associated with at least a portion of the patents of the set in a second interface separate from the first interface upon selection of an icon positioned in the first interface and associated with one of the statistics, for drilling down from the first interface to the second interface, wherein the first additional information includes a list of the patents of the set associated with one of the categories of technology, and
    computer code embodied on the computer readable medium for displaying second additional information associated with at least one of the patents of the list in a third interface separate from the first interface and the second interface upon selection of an additional icon positioned in the second interface and associated with one of the patents, for drilling down from the second interface to the third interface, where the second additional information includes a patent number, a status, an exemplary claim, and an exemplary figure;
  wherein computer code is provided for making the notes accessible to other parties.

3. A non-transitory computer-readable medium encoded with an intellectual property data structure for realizing a function of organizing and reporting information associated with an identifier, comprising:
  an identifier object;
  a notes object correlated with the identifier object for tracking manually entered notes including text associated with the identifier object;
  at least one file object correlated with the identifier object by providing a correspondence between the file object and the identifier object, for tracking manually selected files associated with the identifier object; and
  at least one patent object correlated with the identifier object for tracking a plurality of related patent identifiers associated with the identifier object;
  wherein a set of the patents is reported utilizing the computer readable medium with:

computer code embodied on the computer readable medium for displaying a technology mapping depicting a plurality of categories of technology utilizing a graphical user interface, computer code embodied on the computer readable medium for displaying statistics regarding a number of the patents of the set in each of the categories of technology in a first interface, computer code embodied on the computer readable medium for displaying first additional information associated with at least a portion of the patents of the set in a second interface separate from the first interface upon the selection of an icon positioned in the first interface and associated with one of the statistics, for drilling down from the first interface to the second interface, wherein the first additional information includes a list of the patents of the set associated with one of the categories of technology, and computer code embodied on the computer readable medium for displaying second additional information associated with at least one of the patents of the list in a third interface separate from the first interface and the second interface upon the selection of an additional icon positioned in the second interface and associated with one of the patents, for drilling down from the second interface to the third interface, where the second additional information includes a patent number, a status, an exemplary claim, and an exemplary figure.

4. A non-transitory computer-readable medium encoded with an intellectual property data structure for realizing a function of organizing and reporting information associated with an identifier, comprising:

an identifier object;

a notes object correlated with the identifier object for tracking manually entered notes including text associated with the identifier object;

at least one file object correlated with the identifier object by providing a correspondence between the file object and the identifier object, for tracking manually selected files associated with the identifier object, wherein a manually selected first file is associated with a first identifier corresponding to a single patent, and a manually selected second file is associated with a second identifier corresponding to a group involving a plurality of patents; and at least one patent object correlated with the identifier object for tracking a plurality of related patent identifiers associated with the identifier object;

wherein a set of the patents is reported utilizing the computer readable medium with:

computer code for displaying a technology mapping depicting a plurality of categories of technology utilizing a graphical user interface, computer code for displaying statistics regarding a number of the patents of the set in each of the categories of technology in a first interface, computer code for displaying first additional information associated with at least a portion of the patents of the set in a second interface separate from the first interface upon the selection of an icon positioned in the first interface and associated with one of the statistics, for drilling down from the first interface to the second interface, wherein the first additional information includes a list of the patents of the set associated with one of the categories of technology, computer code for displaying second additional information associated with at least one of the patents of the list in a third interface separate from the first interface and the second interface upon the selection of an additional icon positioned in the second interface and associated with one of the patents, for drilling down from the second interface to the third interface, wherein the second additional information includes a patent number, a status, an exemplary claim, and an exemplary figure;

wherein computer code is provided for making the notes and at least one of the files accessible to other parties utilizing e-mail.

5. A computer program product embodied on a non-transitory computer-readable medium for organizing patents utilizing a computer-implemented system, comprising:

computer code for displaying a notes field for receiving manually entered notes including text;

computer code for receiving the manually entered notes, utilizing the notes field;

computer code for storing the manually entered notes in association with at least one identifier, thus associating the manually entered notes with the at least one identifier;

computer code for receiving a manual selection of a file;

computer code for storing the manually selected file in association with the at least one identifier by providing a correspondence between the file and the at least one identifier, thus associating the manually selected file with the at least one identifier, wherein the computer program product is operable for a manually selected first file to be associated with a first identifier corresponding to a single patent, and a manually selected second file to be associated with a second identifier corresponding to a group involving a plurality of patents; and computer code for associating a plurality of patents with the at least one identifier;

wherein the computer program product is operable such that the manually entered notes, at least one of the manually selected files, and the patents are accessible by subsequent selection of the at least one identifier;

wherein the computer program product is operable such that a set of the patents is reported using:

computer code for displaying a technology mapping depicting a plurality of categories of technology utilizing a graphical user interface, computer code for displaying statistics regarding a number of the patents of the set in each of the categories of technology in a first interface, computer code for displaying first additional information associated with at least a portion of the patents of the set in a second interface separate from the first interface upon the selection of an icon positioned in the first interface and associated with one of the statistics, for drilling down from the first interface to the second interface, wherein the first additional information includes a list of the patents of the set associated with one of the categories of technology, computer code for displaying second additional information associated with at least one of the patents of the list in a third interface separate from the first interface and the second interface upon the selection of an additional icon positioned in the second interface and associated with one of the patents, for drilling down from the second interface to the third interface, wherein the second additional information includes at least one of a patent number, a status, an exemplary claim, and an exemplary figure;

wherein the computer program product is operable such that the notes and at least one of the files are made accessible to other parties utilizing e-mail.

6. The computer program product of claim 5, wherein the computer program product is operable such that the at least one identifier is determined by selecting an already-existing identifier.

7. The computer program product of claim 5, wherein the computer program product is operable such that the at least one identifier is determined by selecting an already-existing identifier utilizing a pull-down menu.

8. The computer program product of claim 5, wherein the computer program product is operable such that the at least one identifier is determined utilizing an add icon.

9. The computer program product of claim 5, wherein the computer program product is operable such that the at least one identifier is determined utilizing a modify icon.

10. The computer program product of claim 5, wherein the computer program product is operable such that the notes field allows a user to cut and paste notes.

11. The computer program product of claim 5, wherein the computer program product is operable such that the patents associated with the at least one identifier are identified by searching a database of already existing identifiers.

12. The computer program product of claim 11, wherein the computer program product is operable such that the database is a comprehensive database of all patents issued by at least one government agency.

13. The computer program product of claim 5, wherein the computer program product is operable such that the file is selected utilizing a file structure field.

14. The computer program product of claim 13, wherein the computer program product is operable such that the file structure field includes a file tree-structure.

15. The computer program product of claim 13, wherein the computer program product is operable such that the file structure field allows a user to browse various folders where files have been previously stored.

16. The computer program product of claim 13, wherein the computer program product is operable such that the file structure is displayed simultaneously with the notes field on the same interface.

* * * * *